US012718220B2

(12) United States Patent
Ikezawa

(10) Patent No.: US 12,718,220 B2
(45) **Date of Patent: *Aug. 25, 2026**

(54) SETTLEMENT DEVICE, SETTLEMENT METHOD, AND RECORDING MEDIUM

(71) Applicant: NEC Corporation, Tokyo (JP)

(72) Inventor: Rumi Ikezawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 18/267,227

(22) PCT Filed: Dec. 22, 2020

(86) PCT No.: PCT/JP2020/047866

§ 371 (c)(1),
(2) Date: Jun. 14, 2023

(87) PCT Pub. No.: WO2022/137327

PCT Pub. Date: Jun. 30, 2022

(65) Prior Publication Data

US 2024/0013186 A1 Jan. 11, 2024

(51) Int. Cl.
*G06Q 20/20* (2012.01)
*G07G 1/12* (2006.01)

(52) U.S. Cl.
CPC ......... *G06Q 20/208* (2013.01); *G06Q 20/204* (2013.01); *G06Q 20/206* (2013.01); *G07G 1/12* (2013.01)

(58) Field of Classification Search
CPC .. G06Q 20/208; G06Q 20/204; G06Q 20/206; G06Q 20/18; G07G 1/12; G07G 1/0036
See application file for complete search history.

(56) References Cited

U.S. PATENT DOCUMENTS 5,494,136 A * 2/1996 Humble .................. A47F 9/047 235/383
8,418,919 B1 * 4/2013 Beyda .................... G06Q 20/20 235/487

(Continued)

FOREIGN PATENT DOCUMENTS

EP 2995225 A1 * 3/2016 ............. A47F 9/047
JP 2001076261 A * 3/2001

(Continued)

OTHER PUBLICATIONS

Mastroberte, T. (2013). Reinventing the Checkout. Progressive Grocer, 92(5), pp. 104-108. (Year: 2013).*

(Continued)

*Primary Examiner* — Ashford S Hayles
(74) *Attorney, Agent, or Firm* — Sughrue Mion PLLC

(57) ABSTRACT

A settlement device according to an aspect of the present disclosure includes: at least one memory configured to store instructions; and at least one processor configured to execute the instructions to: accept a selection of one of a first process of acquiring settlement information of a commodity registered using a terminal device used by a customer, a second process of acquiring settlement information of a commodity registered by the self-settlement device having a registration function of registering the commodity through an operation of a customer, and a third process of acquiring settlement information of a commodity registered using a registration device that registers the commodity through an operation of a store employee; and perform the selected first, second, or third process and perform settlement for a price using the acquired settlement information.

7 Claims, 20 Drawing Sheets

(56) References Cited

U.S. PATENT DOCUMENTS

| | | | | |
|---|---|---|---|---|
| 10,410,196 | B1 * | 9/2019 | Ran | G06Q 20/322 |
| 10,664,819 | B1 * | 5/2020 | Zafar | G06Q 20/322 |
| 2002/0103708 | A1 * | 8/2002 | Kloubakov | G06Q 20/202 348/E7.086 |
| 2003/0006098 | A1 * | 1/2003 | Wike, Jr. | A47F 9/046 186/61 |
| 2004/0222302 | A1 * | 11/2004 | Matsumori | G06Q 30/0601 235/472.01 |
| 2007/0235531 | A1 * | 10/2007 | Addison | A47F 9/04 235/383 |
| 2011/0225056 | A1 * | 9/2011 | Akiyama | G07G 1/0018 705/16 |
| 2011/0295704 | A1 * | 12/2011 | Edwards | G06Q 30/06 705/16 |
| 2012/0000976 | A1 * | 1/2012 | Rollyson | G06Q 20/208 235/375 |
| 2012/0095853 | A1 * | 4/2012 | Von Bose | G06Q 20/20 705/16 |
| 2012/0203697 | A1 * | 8/2012 | Morgan | G06Q 20/3276 705/44 |
| 2012/0205433 | A1 * | 8/2012 | Dudek | G06Q 20/209 235/375 |
| 2013/0191230 | A1 * | 7/2013 | Edwards | G07G 1/0009 705/16 |
| 2013/0256395 | A1 * | 10/2013 | Barkan | G06F 17/00 235/375 |
| 2013/0332251 | A1 * | 12/2013 | Ioannidis | G06Q 20/3274 705/26.8 |
| 2014/0089087 | A1 * | 3/2014 | Argue | G06Q 20/3224 705/14.58 |
| 2014/0214577 | A1 * | 7/2014 | Acker, Jr | G01G 19/12 705/23 |
| 2014/0263631 | A1 * | 9/2014 | Muniz | G06Q 20/208 235/383 |
| 2015/0025969 | A1 * | 1/2015 | Schroll | G06Q 20/208 705/14.64 |
| 2015/0120475 | A1 * | 4/2015 | Pedley | G06Q 20/201 705/20 |
| 2015/0127414 | A1 * | 5/2015 | Geffert | G06Q 10/0635 705/7.28 |
| 2015/0134470 | A1 * | 5/2015 | Hejl | G06Q 20/208 705/21 |
| 2015/0154592 | A1 * | 6/2015 | Loannidis | G06Q 20/387 705/64 |
| 2016/0110797 | A1 * | 4/2016 | Brosnan | G06F 3/012 705/26.8 |
| 2016/0163162 | A1 * | 6/2016 | Skiles | G07G 1/009 235/383 |
| 2016/0253647 | A1 * | 9/2016 | Gotanda | G07G 1/01 705/17 |
| 2016/0358145 | A1 * | 12/2016 | Montgomery | G06F 16/9535 |
| 2016/0371606 | A1 * | 12/2016 | Schmidt | G06Q 10/02 |
| 2017/0300980 | A1 * | 10/2017 | Soldate | H04W 88/02 |
| 2017/0316656 | A1 * | 11/2017 | Chaubard | G07G 1/0045 |
| 2018/0150817 | A1 * | 5/2018 | Han | G07G 1/0018 |
| 2018/0240095 | A1 * | 8/2018 | Buckley | G06Q 30/0601 |
| 2018/0308118 | A1 * | 10/2018 | Biswal | G06Q 30/0215 |
| 2019/0125106 | A1 * | 5/2019 | Bode | G06K 7/10445 |
| 2019/0147426 | A1 * | 5/2019 | Kieffer | H04M 1/72412 705/17 |
| 2019/0295344 | A1 * | 9/2019 | Bodell | G07C 9/28 |
| 2020/0118110 | A1 * | 4/2020 | Coverstone | G06Q 20/322 |
| 2020/0134588 | A1 * | 4/2020 | Nelms | G06Q 20/20 |
| 2020/0273013 | A1 * | 8/2020 | Garner | G06Q 20/3221 |
| 2020/0279240 | A1 * | 9/2020 | Glaser | G06Q 20/20 |
| 2021/0064140 | A1 * | 3/2021 | Egan | G06Q 20/204 |
| 2021/0090052 | A1 * | 3/2021 | Maita | G06Q 20/202 |
| 2021/0090053 | A1 * | 3/2021 | Kaneko | B62B 5/0096 |
| 2021/0192480 | A1 * | 6/2021 | Gotanda | G06Q 20/201 |
| 2021/0279710 | A1 * | 9/2021 | Adachi | G06Q 20/18 |
| 2022/0138714 | A1 * | 5/2022 | Kaneko | G06Q 20/3276 705/21 |
| 2022/0291979 | A1 * | 9/2022 | Martin | G06F 9/547 |
| 2023/0019687 | A1 * | 1/2023 | Amano | G06Q 20/4014 |
| 2023/0063784 | A1 * | 3/2023 | Yin | G06Q 20/0855 |
| 2023/0091825 | A1 * | 3/2023 | Hayashi | G06Q 20/202 705/21 |
| 2023/0096680 | A1 * | 3/2023 | Tsuchiya | G06Q 20/3223 705/44 |
| 2023/0334455 | A1 * | 10/2023 | Sugiyama | G06Q 20/202 |
| 2024/0257225 | A1 * | 8/2024 | Pincumbe | G06Q 20/3274 |

FOREIGN PATENT DOCUMENTS

| | | | | | |
|---|---|---|---|---|---|
| JP | 2004252865 | A | * | 9/2004 | |
| JP | 2005-107570 | A | | 4/2005 | |
| JP | 4028773 | B2 | * | 12/2007 | A47F 9/046 |
| JP | 2013131220 | A | * | 7/2013 | G06Q 20/18 |
| JP | 2015-045930 | A | | 3/2015 | |
| JP | 2017102856 | A | * | 6/2017 | |
| JP | 2018109932 | A | * | 7/2018 | |
| JP | 2019-139395 | A | | 8/2019 | |
| JP | 2019-211910 | A | | 12/2019 | |
| JP | 2020042464 | A | * | 3/2020 | |
| JP | 2020-60817 | A | | 4/2020 | |
| JP | 2020-091803 | A | | 6/2020 | |
| JP | 2020107122 | A | * | 7/2020 | |
| JP | 2020194604 | A | * | 12/2020 | |
| JP | 2025004266 | A | * | 1/2025 | G06Q 20/206 |
| JP | 7650491 | B2 | * | 3/2025 | |
| WO | WO-2019181755 | A1 | * | 9/2019 | G07G 1/12 |
| WO | WO-2020045196 | A1 | * | 3/2020 | G07G 3/003 |
| WO | WO-2020045340 | A1 | * | 3/2020 | G07G 1/12 |

OTHER PUBLICATIONS

Howell, D. (2006). Line-Busting Adoption Show. Chain Store Age, 82(9), 125. (Year: 2006).*

International Search Report for PCT Application No. PCT/JP2020/047866, mailed on Feb. 16, 2021.

English translation of Written opinion for PCT Application No. PCT/JP2020/047866, mailed on Feb. 16, 2021.

JP Office Action for JP Application No. 2022-570807, mailed on Mar. 26, 2024 with English Translation.

JP Submission of Publication issued Sep. 5, 2025 in corresponding JP Application No. 2022- 570807, English Translation.

* cited by examiner 1
10
13
16
12
11
POS SERVER

START
ACCEPT MODE
S101
S102
ACCEPTED MODE?
REGISTER-LESS MODE
FULL SELF-MODE
SEMI-SELF-MODE
S104
PERFORM FIRST PROCESS AND PERFORM SETTLEMENT FOR PRICE
S105
PERFORM SECOND PROCESS AND PERFORM SETTLEMENT FOR PRICE
S106
PERFORM THIRD PROCESS AND PERFORM SETTLEMENT FOR PRICE
END

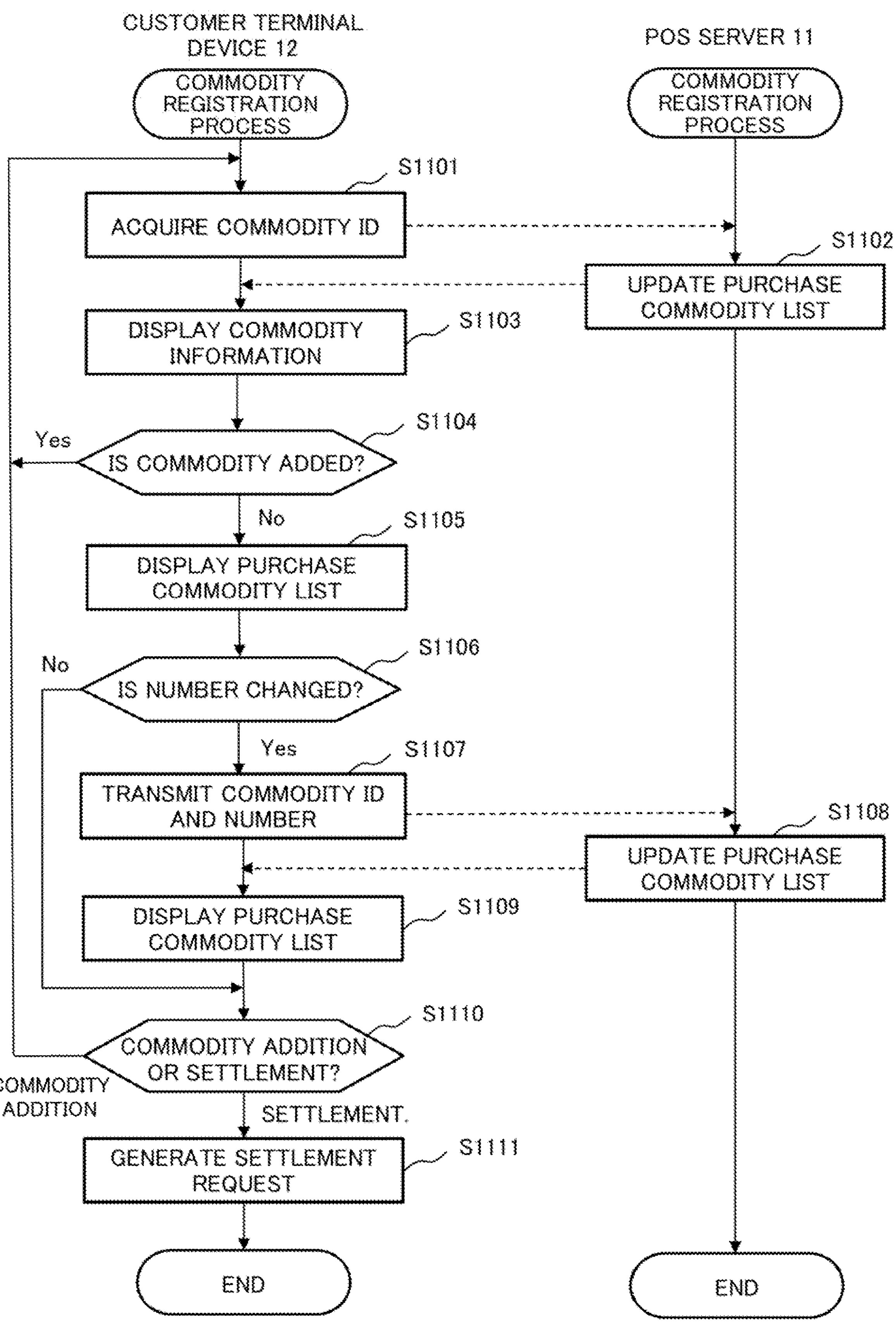
Fig.8
CUSTOMER TERMINAL DEVICE 12
POS SERVER 11
COMMODITY REGISTRATION PROCESS
COMMODITY REGISTRATION PROCESS
S1101
ACQUIRE COMMODITY ID
S1102
UPDATE PURCHASE COMMODITY LIST
DISPLAY COMMODITY INFORMATION
S1103
S1104
Yes
IS COMMODITY ADDED?
No
S1105
DISPLAY PURCHASE COMMODITY LIST
S1106
No
IS NUMBER CHANGED?
Yes
S1107
TRANSMIT COMMODITY ID AND NUMBER
S1108
UPDATE PURCHASE COMMODITY LIST
DISPLAY PURCHASE COMMODITY LIST
S1109
S1110
COMMODITY ADDITION OR SETTLEMENT?
COMMODITY ADDITION
SETTLEMENT
GENERATE SETTLEMENT REQUEST
S1111
END
END

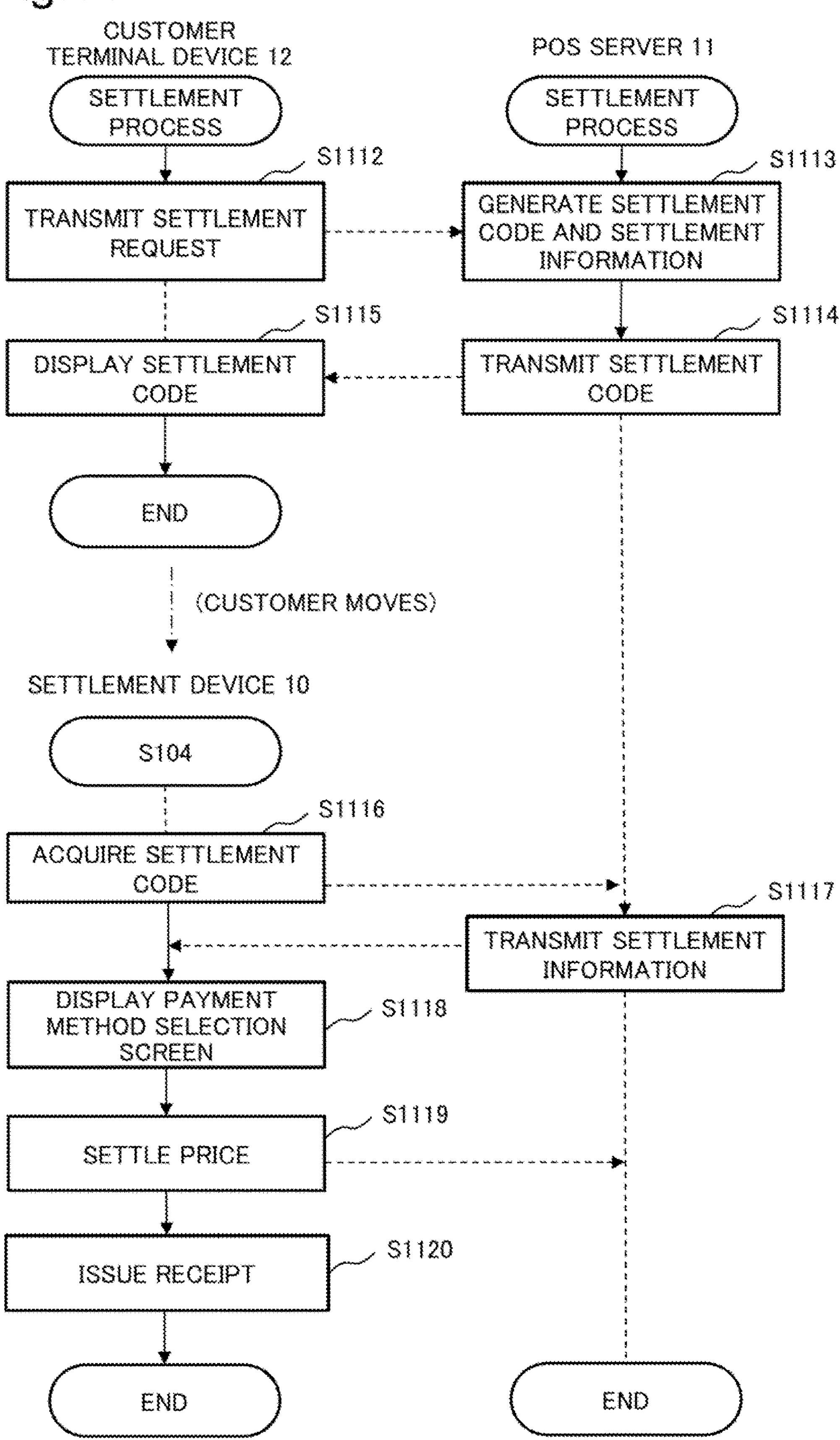
Fig.11
CUSTOMER TERMINAL DEVICE 12
POS SERVER 11
SETTLEMENT PROCESS
SETTLEMENT PROCESS
S1112
TRANSMIT SETTLEMENT REQUEST
S1113
GENERATE SETTLEMENT CODE AND SETTLEMENT INFORMATION
S1115
DISPLAY SETTLEMENT CODE
S1114
TRANSMIT SETTLEMENT CODE
END
(CUSTOMER MOVES)
SETTLEMENT DEVICE 10
S104
S1116
ACQUIRE SETTLEMENT CODE
S1117
TRANSMIT SETTLEMENT INFORMATION
DISPLAY PAYMENT METHOD SELECTION SCREEN
S1118
S1119
SETTLE PRICE
S1120
ISSUE RECEIPT
END
END

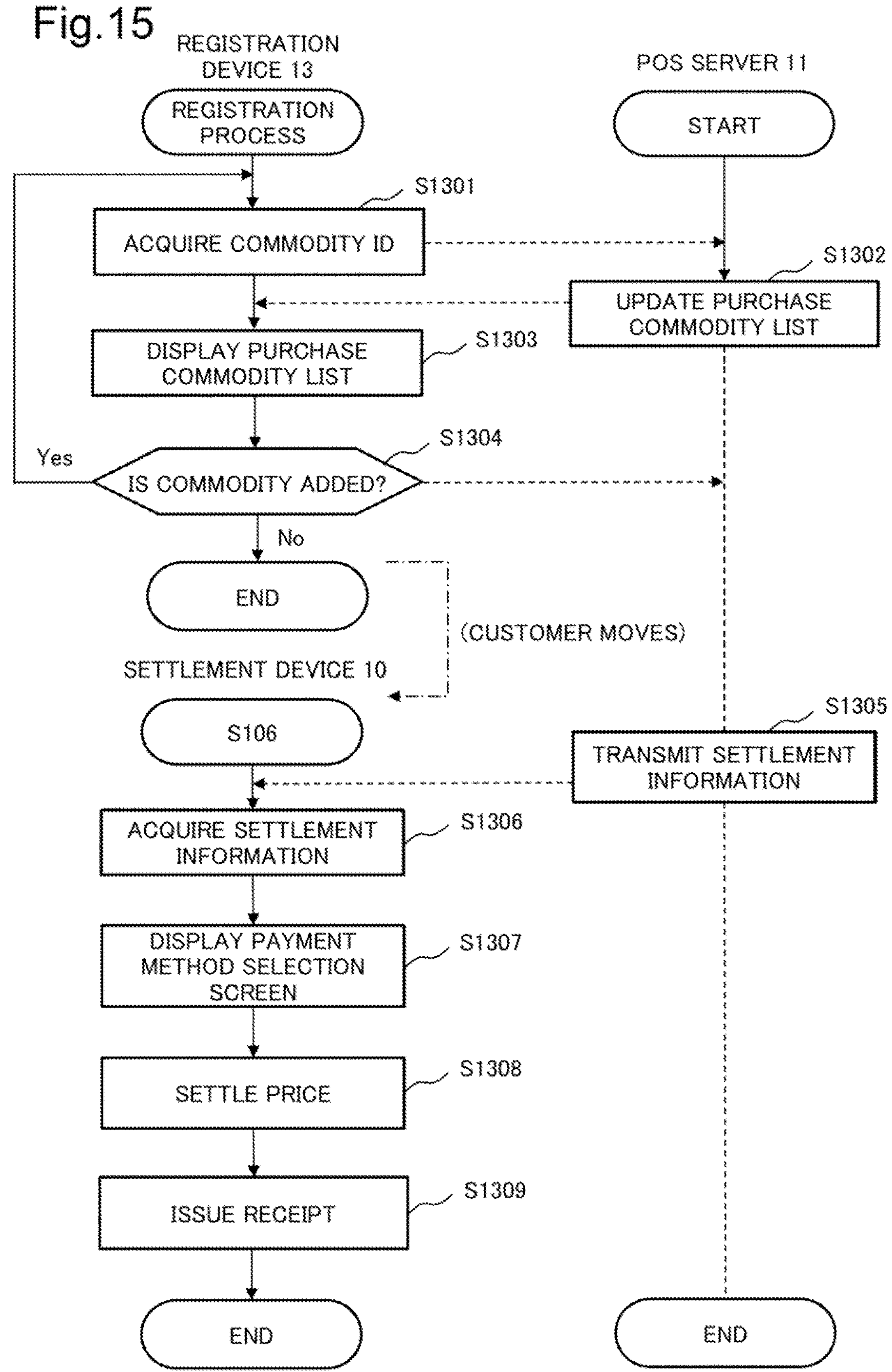
Fig.15
REGISTRATION DEVICE 13
POS SERVER 11
REGISTRATION PROCESS
START
S1301
ACQUIRE COMMODITY ID
S1302
UPDATE PURCHASE COMMODITY LIST
DISPLAY PURCHASE COMMODITY LIST
S1303
S1304
Yes
IS COMMODITY ADDED?
No
END
(CUSTOMER MOVES)
SETTLEMENT DEVICE 10
S1305
S106
TRANSMIT SETTLEMENT INFORMATION
ACQUIRE SETTLEMENT INFORMATION
S1306
DISPLAY PAYMENT METHOD SELECTION SCREEN
S1307
SETTLE PRICE
S1308
ISSUE RECEIPT
S1309
END
END START
ACCEPT SELECTION OF PROCESS
S201
SELECTED PROCESS?
S2021
FIRST PROCESS
SECOND PROCESS
THIRD PROCESS
PERFORM FIRST PROCESS
S2022
PERFORM SECOND PROCESS
S2023
PERFORM THIRD PROCESS
S2024
PERFORM SETTLEMENT BASED ON SETTLEMENT INFORMATION
S203
END

SETTLEMENT DEVICE, SETTLEMENT METHOD, AND RECORDING MEDIUM

This application is a National Stage Entry of PCT/JP2020/047866 filed on Dec. 22, 2020, the contents of all of which are incorporated herein by reference, in their entirety.

TECHNICAL FIELD

The present disclosure relates to a settlement device or the like of a store.

BACKGROUND ART

In recent years, in stores such as supermarkets, registration of commodities purchased by reading barcodes attached to the commodities and settlement for prices is performed in various forms. For example, there are cash registers with which store employees read commodity barcodes and then customers perform immediate settlement for a price on the spots. On the other hand, in recent years, there have come to be types of cash registers in which store employees read commodity barcodes or the like with registration devices, and then customers perform settlement with settlement devices different from the registration devices, which are called "semi-self-registers." PTL 1 discloses a point of sales (POS) terminal capable of performing both a commodity registration process and payment process for a price by one terminal.

CITATION LIST

Patent Literature

PTL 1: JP 2019-211910 A

SUMMARY OF INVENTION

Technical Problem

In recent years, there have also come to be types of systems that do not use registers for registration (also referred to as "register-less systems") in which customers read commodity barcodes using mobile terminals such as their smartphones, register commodities, and perform settlement with settlement devices. In this way, when the commodity registration is performed in various modes, if it is necessary to individually prepare a settlement device corresponding to each mode, facility costs of stores become excessive.

An object of the present disclosure is to provide a settlement device that can cope with a case where commodities are registered in various modes.

Solution to Problem

According to an aspect of the present disclosure, a settlement device includes: an acceptance means configured to accept a selection of one of a first process of acquiring settlement information of a commodity registered using a terminal device used by a customer, a second process of acquiring settlement information of a commodity registered by the settlement device having a registration function of registering the commodity through an operation of a customer, and a third process of acquiring settlement information of a commodity registered using a registration device that registers the commodity through an operation of a store employee; and a settlement means configured to perform the selected first, second, or third process and perform settlement for a price using the acquired settlement information.

According to another aspect of the present disclosure, a settlement method includes: accepting a selection of one of a first process of acquiring settlement information of a commodity registered using a terminal device used by a customer, a second process of acquiring settlement information of a commodity registered by a settlement device having a registration function of registering the commodity through an operation of a customer, and a third process of acquiring settlement information of a commodity registered using a registration device that registers the commodity through an operation of a store employee; and performing the selected first, second, or third process and performing settlement for a price using the acquired settlement information.

According to still another aspect of the present disclosure, a non-transitory computer-readable recording medium records a program causing a settlement device to function as: an acceptance means configured to accept a selection of one of a first process of acquiring settlement information of a commodity registered using a terminal device used by a customer, a second process of acquiring settlement information of a commodity registered by the settlement device having a registration function of registering the commodity through an operation of a customer, and a third process of acquiring settlement information of a commodity registered using a registration device that registers the commodity through an operation of a store employee; and a settlement means configured to perform the selected first, second, or third process and perform settlement for a price using the acquired settlement information.

Advantageous Effects of Invention

According to the present disclosure, settlement can be performed even when commodity registration is performed in various modes.

BRIEF DESCRIPTION OF DRAWINGS

FIG. 8 is a flowchart illustrating an example of a commodity registration process.

FIG. 11 is a flowchart illustrating an example of a settlement process.

FIG. 15 is a flowchart illustrating examples of a registration process and a settlement process.

EXAMPLE EMBODIMENT

Hereinafter, example embodiments of a settlement device, a settlement method, a settlement program, and a recording medium recording the program according to the present disclosure will be described in detail with reference to the drawings. The present example embodiment does not limit the disclosed technology.

First Example Embodiment

In a first example embodiment, a settlement device capable of switching between three settlement modes that are a register-less mode, a full self-mode, and a semi-self-mode, will be described. The register-less mode is a mode in which a settlement device performs settlement for the price of a purchase-scheduled commodity registered by a customer using a customer terminal device such as his or her smartphone. The full self-mode is a mode in which a settlement device performs settlement for the price of a purchase-scheduled commodity registered by a customer using a settlement device. The semi-self-mode is a mode in which a settlement device performs settlement for the price of a purchase-scheduled commodity registered by a store employee using a registration device. A plurality of settlement devices may be provided in a store and may each operate in different modes.

[Configuration]

Figure 1:
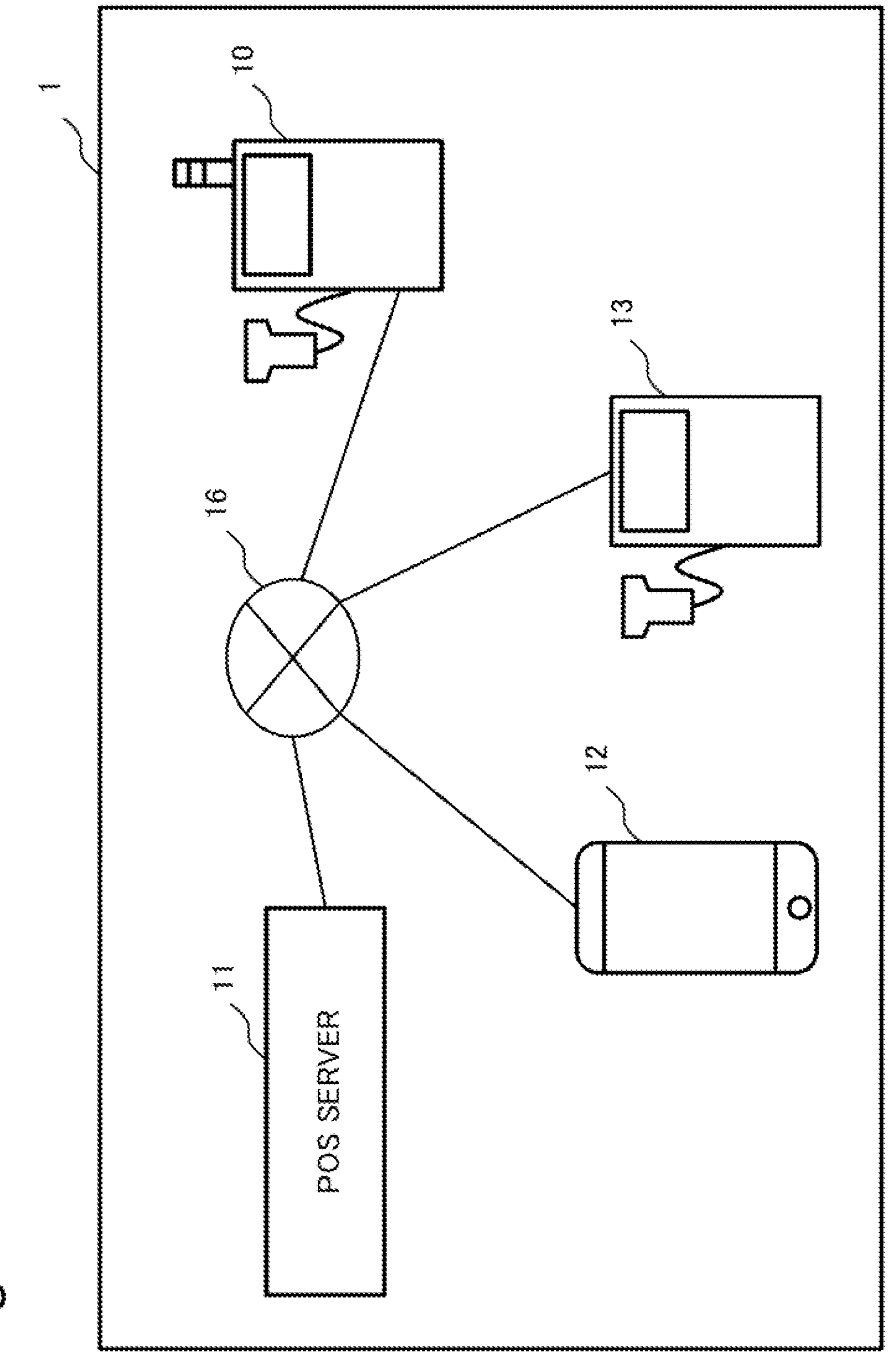
FIG. 1 is a diagram illustrating a configuration of an information processing system 1 according to a first example embodiment.

FIG. 1 illustrates a configuration of an information processing system 1 according to the first example embodiment. The information processing system 1 includes a settlement device 10, a POS server 11, a customer terminal device 12, and a registration device 13. The settlement device 10, the POS server 11, the customer terminal device 12, and the registration device 13 may be connected via, for example, a communication network 16.

Each of the settlement device 10, the customer terminal device 12, and the registration device 13 has a registration function of registering a commodity to be purchased by a customer. However, the registration function of each device may not be used according to a settlement mode of the settlement device 10. For example, when the settlement device 10 in the full self-mode is used, the registration function of the settlement device 10 is used. For example, in the case of the register-less mode, the settlement function of the settlement device 10 is mainly used.

In the first example embodiment, the settlement device 10 is mainly operated by a customer. The settlement device 10 acquires settlement information of a registered commodity in one of the settlement modes that are the register-less mode, the full self-mode, and the semi-self-mode, and performs the settlement for a price. The settlement information includes at least information on a purchase price. Specifically, the settlement information may be a purchase price itself or commodity information and number necessary for calculating the purchase price. The settlement information may include information included in each receipt to be described below. Although not illustrated, the number of settlement devices 10 is not particularly limited.

The POS server 11 is a server that manages various types of sales information such as commodity information including a price, an inventory status, and the like related to a commodity which is sold in a store, and sales information of the store. The POS server 11 may collectively manage sales information of a plurality of stores. Alternatively, there may be the POS server 11 for each store. Then, the POS server 11 may manage the sales information of one store.

Further, the POS server 11 may perform processes in response to requests from the settlement device 10, the customer terminal device 12, and the registration device 13. For example, the POS server 11 may transmit information necessary for display control of the customer terminal device 12 to the customer terminal device 12. For example, the POS server 11 may transmit information regarding a screen on which a list of purchase-scheduled commodities registered by the settlement device 10, the customer terminal device 12, or the registration device 13 is displayed along with selling prices to the settlement device 10, the customer terminal device 12, or the registration device 13. The registered purchase-scheduled commodities are referred to as "purchased commodities" below. The list of purchase-scheduled commodities is referred to as a "purchase commodity list" below. The POS server 11 may manage information related to a customer registered as a member of a store. Various types of information regarding the POS server 11 will be described below.

Here, an example in which the POS server 11 is implemented with one device will be described. However, an example of the POS server 11 is not particularly limited. The POS server 11 may be implemented with different devices for each function or database (DB).

The customer terminal device 12 is, for example, a terminal device such as a smartphone or a tablet used by a customer. The type of customer terminal device 12 is not particularly limited. The customer terminal device 12 may be lent at a store. The customer terminal device 12 may be provided in a shopping basket or a shopping cart. The customer terminal device 12 may not be used in accordance with a settlement mode of the settlement device 10. For example, when the settlement device 10 is in the full self-mode or the semi-self-mode, the customer terminal device 12 is not used. The number of customer terminal devices 12 is not particularly limited. The customer terminal device 12 is an example embodiment of a terminal device used by a customer.

The registration device 13 is operated by a store employee. The registration device 13 may not be used in accordance with a settlement mode of the settlement device 10. For example, when the settlement device 10 is in the full self-mode or the register-less mode, the registration device 13 is not used. The number of registration devices 13 is not particularly limited.

A configuration example of each device according to the first example embodiment will be described with reference to FIGS. 2 to 5.

Figure 2:
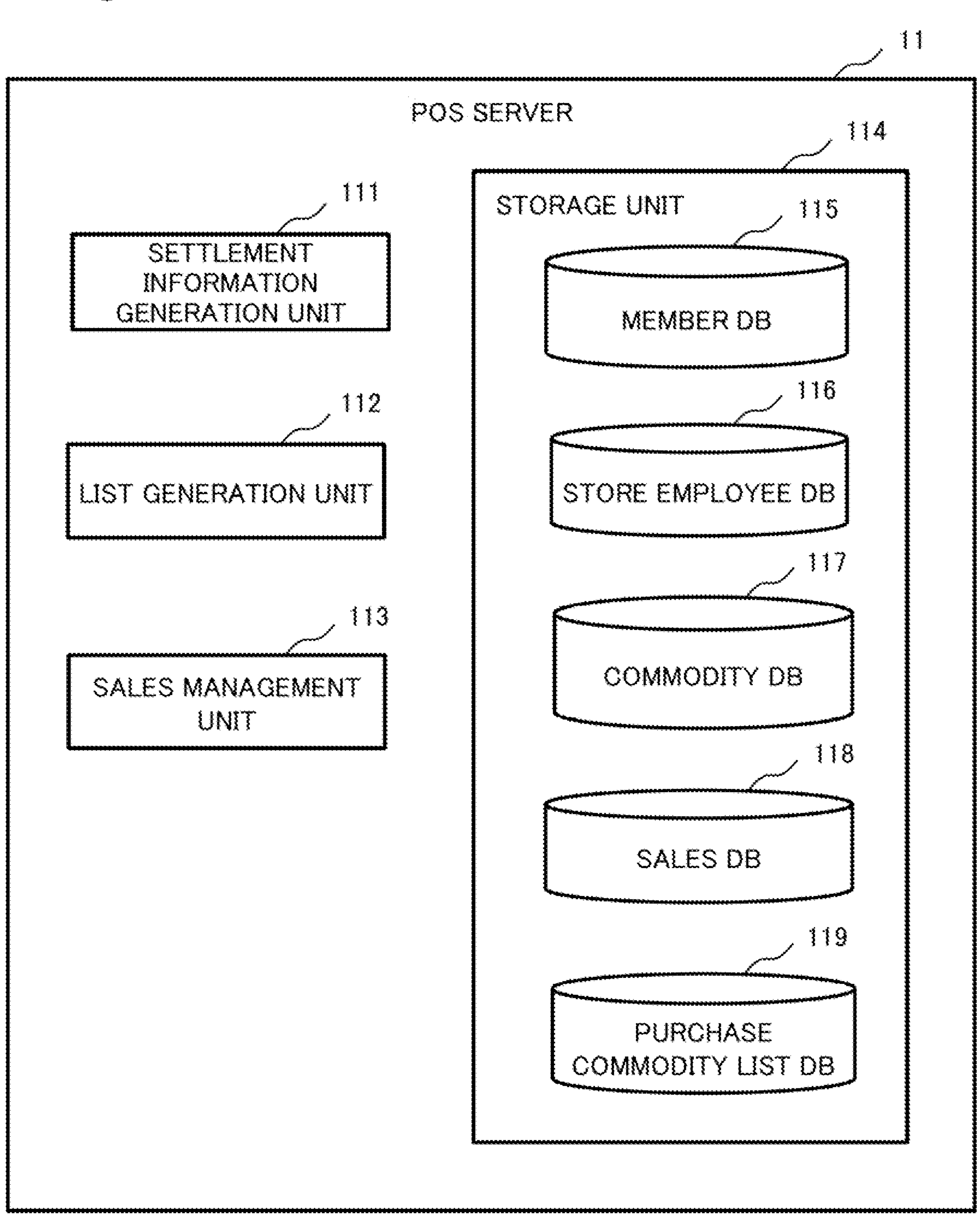
FIG. 2 is a block diagram illustrating a configuration example of a POS server 11.

FIG. 2 is a block diagram illustrating a configuration example of the POS server 11. The POS server 11 includes a settlement information generation unit 111, a list generation unit 112, a sales management unit 113, and a storage unit 114.

The storage unit 114 stores, for example, data used for a process of each unit of the POS server 11. Examples of the storage unit include a read-only memory (ROM), a random access memory (RAM), a semiconductor memory, a hard disk drive (HDD), and a solid-state drive (SSD). The storage unit 114 may be a combination of a ROM, a RAM, a semiconductor memory, an HDD, and an SSD. The storage unit 114 includes a member DB 115, a store employee DB 116, a commodity DB 117, a sales DB 118, and a purchase commodity list DB 119.

The list generation unit 112 generates a purchase commodity list in which information for identifying a customer, commodity information of commodities scheduled to be purchased by the customers, and a purchase number are associated for each customer, and stores the purchase commodity list in the purchase commodity list DB 119.

The purchase commodity list is uniquely identified in accordance with the information for identifying a customer. The information for identifying the customer is, for example, a customer ID for uniquely identifying a customer. For example, when registration of a commodity of a customer is started, the list generation unit 112 assigns the customer ID to the customer. When one transaction is assumed to be defined as a transaction from start of registration to end of settlement, the customer ID may be assigned for each transaction. The commodity information included in the purchase commodity list includes information with which a commodity can uniquely identified.

The list generation unit 112 updates the purchase commodity list based on an update request from the settlement device 10, the customer terminal device 12, or the registration device 13. Specifically, the list generation unit 112 adds or deletes the commodity included in the purchase commodity list based on the commodity information included in the update request.

The settlement information generation unit 111 generates settlement information based on the purchase commodity list, and transmits the settlement information thus generated to the settlement device 10. The settlement information may include, for example, a customer ID in order to uniquely identify which purchase commodity list the settlement information is generated based on. The settlement information generation unit 111 may generate, as the settlement information, a purchase commodity list in which commodities are registered. The settlement information generation unit 111 may generate the settlement information after accepting the settlement request of the customer terminal device 12, the settlement device 10, or the registration device 13.

For example, the sales management unit 113 updates the sales DB 118 according to the content of settlement.

The member DB 115 stores member information for each member (customer), for example. The member information is, for example, at least one of a member identifier (ID), a name of the member, a sex of the member, an age or an age group of the member, and a notification destination of the member. The member ID is, for example, an identifier for uniquely identifying the member. The type of the member ID is not particularly limited. The member ID may be represented by a membership number. The notification destination is a notification destination such as an e-mail address or a telephone number. In addition, the member DB 115 may further store information such as a password, a past purchase history, and points for each member. Further, the member DB 115 may further store the biometric information for each member. The biometric information is not particularly limited. Examples of the biometric information include face feature amount information, face image data, fingerprint data, iris data, vein data, and the like.

The member DB 115 may not include a part of the above-described information related to the member. Furthermore, the member DB 115 may include information other than the above-described information regarding the member.

The store employee DB 116 stores, for example, store employee information for each store employee. The store employee information is, for example, at least one of a store employee ID and a store employee name. The store employee ID is, for example, an identifier for uniquely identifying a member. The store employee ID is not particularly limited. The store employee ID may be represented by a store employee number. The store employee DB 116 may further store information such as a password, a work schedule, and biometric information for each store employee. The biometric information is as described above in the member DB 115.

The store employee DB 116 may not include a part of the above-described information regarding the store employee. In addition, the store employee DB 116 may include information other than the above-described information regarding the store employee.

The commodity DB 117 stores commodity information of commodities handled in a store or an affiliated store including a store. Specifically, the commodity DB 117 stores commodity information for each commodity, for example. The commodity information is, for example, information such as a commodity ID, a commodity name, a classification of a commodity, a price of a commodity, a characteristic of a commodity, and a stock status of a commodity. The commodity ID is, for example, a commodity code (Hereinafter, the commodity code is referred to as a commodity code). The commodity code is at least one of a Japanese Article Number (JAN) code, a European Article Number (EAN) code, and a Universal Product Code (UPC). In addition, the commodity ID may be a commodity name. The classification of the commodities is not particularly limited. For example, the classification of commodities may be roughly classified into, for example, food, stationery, and the like. The classification of the commodity may be a classification of confectionery, meat, vegetable, or the like. The price of the commodity is the price of the commodity. The characteristic of the commodity is not particularly limited. The characteristic of the commodity may be a best-before date, a use-by date, a manufacturer, or the like.

In addition, the commodity information may include information for identifying the commodity in addition to the commodity ID. For example, the commodity information may include commodity image data, characteristic amount information obtained from the commodity image data, and the like.

The commodity DB 117 may not include a part of the above-described information regarding the commodity. Furthermore, the commodity DB 117 may include information other than the above-described information regarding the commodity.

The purchase commodity list DB 119 stores, for each customer, the latest purchase commodity list for which settlement has not been completed. The purchase commodity list DB 119 stores, for example, a purchase commodity list in which a customer ID, commodity information of a commodity to be purchased by the customer, and a purchase number are associated with each other. A member ID may be used as the customer ID. Alternatively, the purchase commodity list DB 119 may store the customer ID and the member ID in association with each other. The purchase commodity list DB 119 may be associated with the member DB 115 by the member ID. The commodity information included in the purchase commodity list includes information that can uniquely identify a commodity, such as a commodity ID. As a result, the purchase commodity list DB 119 is associated with the commodity DB 117 by the commodity ID. Therefore, information on the price of the commodity is obtained from the commodity DB 117 based on the commodity ID of the purchase commodity list. The purchase commodity list DB 119 may store, as commodity information, information on the tax-included price of a commodity based on the information on the price of the commodity acquired from the commodity DB 117.

The purchase commodity list DB 119 may not include a part of the above-described information regarding the purchase commodity list. In addition, the purchase commodity list DB 119 may include information other than the above-described information regarding the purchase commodity list.

The sales DB 118 stores, for example, information regarding sales of a store for each store. For example, the sales DB 118 may manage information corresponding to each settlement for each store. The sales DB 118 stores, for example, information such as a store ID, an ID of a device that has performed commodity registration, an ID of a user of the device, an ID of the settlement device 10, a commodity ID of a purchased commodity, a purchase number, and purchase date and time in association with each other. The store ID is an identifier for uniquely identifying the store. The ID of the device that has performed commodity registration registered in the sales DB 118 is registered in the sales DB 118 that is an identifier uniquely identifying the settlement device 10, the customer terminal device 12, or the registration device 13. The ID of the settlement device 10 is an identifier for uniquely identifying the settlement device 10 that has performed the settlement. The ID of the user (operator) registered in the sales DB 118 is a store employee ID or a member ID of the user who uses the registration device 13 or the customer terminal device 12. The sales DB 118 may include information indicating a mode of the settlement device 10 that has performed the settlement. Furthermore, the sales DB 118 may include information included in each receipt to be described below as other information.

The sales DB 118 may not include a part of the above-described information regarding sales. Furthermore, the sales DB 118 may include information other than the above-described information regarding sales. The POS server 11 may not include a part of the functional units.

The POS server 11 may have a functional unit (not illustrated). Furthermore, the functional unit of the POS server 11 illustrated in FIG. 2 may be implemented by a plurality of devices. For example, each functional unit may be implemented by two devices of a device including the settlement information generation unit 111 and the list generation unit 112 and a device including the sales management unit 113. Alternatively, each functional unit may be implemented by three devices of a device including the settlement information generation unit 111, a device including the list generation unit 112, and a device including the sales management unit 113. Alternatively, the settlement information generation unit 111 may be implemented by a different device according to a device performing the commodity registration process among the customer terminal device 12, the settlement device 10, or the registration device 13.

Furthermore, for ease of description and understanding, an example in which the POS server 11 includes various DBs will be described, but the present invention is not limited thereto. For example, the various DBs may be included in different devices. For example, a server that manages the sales DB 118, a server that manages the member DB 115, and a server that manages the purchase commodity list DB 119 may be different from each other. In such a case, the server that manages the sales DB 118 and the server that manages the member DB 115 function as a database server. The server that manages the purchase commodity list DB 119 functions as, for example, an application server. Each server passes information to be used for the assigned process via, for example, the communication network 16 or the like.

Furthermore, the POS server 11 may handle various types of information (not illustrated). For example, the POS server 11 may acquire information regarding a change in selling price such as a discount amount, a bundle discount, a set discount, and a discount rate, and perform settlement process using the information. Alternatively, the POS server 11 may update the purchase commodity list using the information. The bundle discount is a discount given when a plurality of specific commodities are purchased. The set discount is a discount for a combination of specific commodities.

Figure 3:
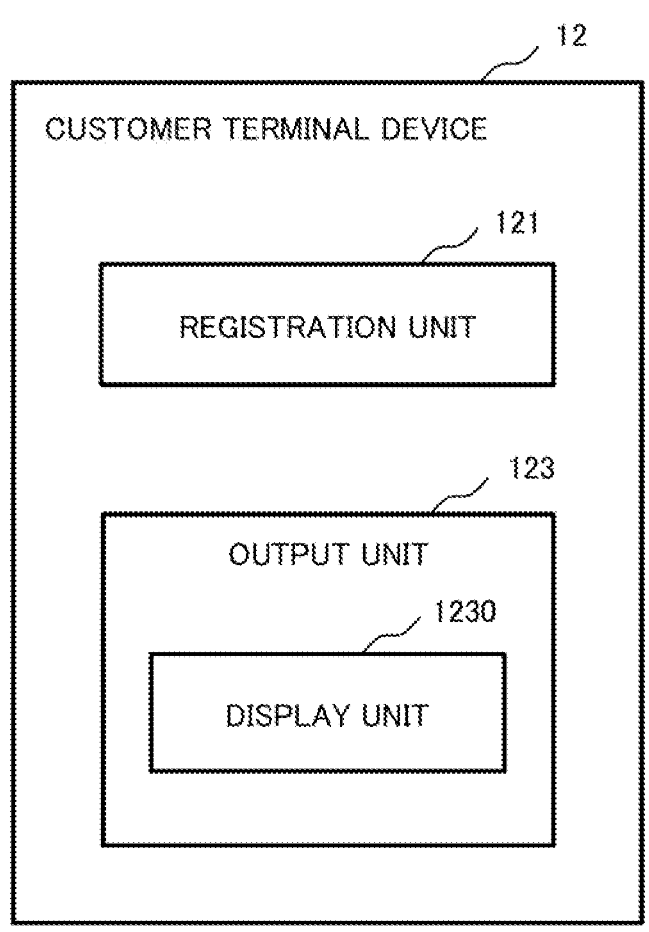
FIG. 3 is a block diagram illustrating a configuration example of a customer terminal device 12.

FIG. 3 is a block diagram illustrating a configuration example of the customer terminal device 12. The customer terminal device 12 includes a registration unit 121 and an output unit 123. The output unit 123 includes a display unit 1230. A storage unit (not illustrated) of the customer terminal device 12 stores a member ID and an identifier for identifying the customer terminal device 12.

The registration unit 121 acquires the commodity ID of the commodity selected by the customer, transmits an update request including the commodity ID to the POS server 11, and causes the POS server 11 to register the commodity as the purchase-scheduled commodity.

The registration unit 121 acquires a commodity ID of a purchased commodity, for example, by reading a commodity code attached to the commodity or the like via an imaging device (not illustrated). The imaging device is not particularly limited and is, for example, a camera included in the customer terminal device 12. The commodity code is the above-described JAN code or the like. The imaging device reads an encoded commodity code such as a barcode or a 2-dimensional code. The registration unit 121 may acquire the commodity ID by identifying the commodity using an image recognition function from, for example, an image of the commodity captured by the imaging device.

The registration unit 121 may acquire the commodity ID by reading an image of a commodity captured in advance or an image of a picture of a commodity via the imaging device. These images may include a commodity code.

The registration unit 121 may acquire the commodity ID by reading a tag to which a radio frequency identifier (RFID) is attached via the reading device. When the RFID is used, the reading device is an RFID reader.

The registration unit 121 may acquire the commodity ID by accepting a selection of a commodity from a result obtained by searching for the commodity. For example, a method of searching for the commodity is not particularly limited. The commodity may be searched with characters. The commodity may be searched with an image. For example, the registration unit 121 may acquire the commodity ID by accepting a selection of a commodity to be purchased from the displayed image of the commodity.

The registration unit 121 may acquire the commodity ID by accepting an input of a number of a JAN code via an input device (not illustrated). Examples of the input device include a touch panel display and a keyboard with which numbers and characters can be input.

The customer terminal device 12 transmits the commodity ID acquired by the registration unit 121 to the POS server 11. At this time, the customer terminal device 12 also transmits the member ID or an identifier for identifying the customer terminal device 12 to the POS server 11. The customer terminal device 12 may accept a name and a price of a commodity corresponding to the transmitted commodity ID from the POS server 11. The display unit 1230 displays the name and price of the commodity.

The output unit 123 outputs a settlement code that can be read by the settlement device 10. The settlement code includes information for specifying settlement information generated in the POS server 11. The settlement code may be a customer ID, an identifier of the customer terminal device 12, or a member ID. An output method is not particularly limited. For example, the display unit 1230 may display a barcode obtained by encoding a settlement code or a 2-dimensional code.

Figure 4:
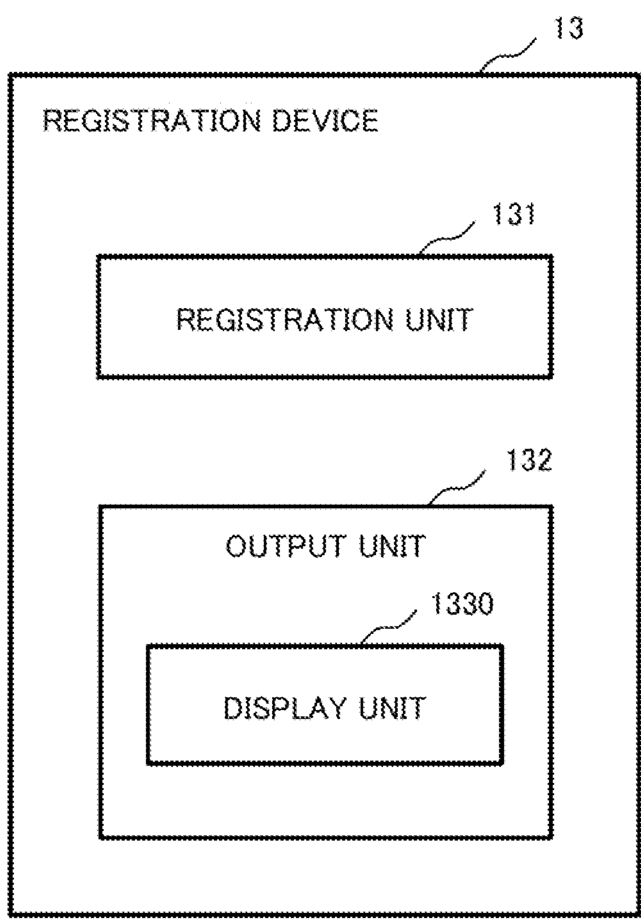
FIG. 4 is a block diagram illustrating a configuration example of a registration device 13.

FIG. 4 is a block diagram illustrating a configuration example of the registration device 13. The registration device 13 includes a registration unit 131 and an output unit 133. The output unit 133 includes a display unit 1330.

The registration unit 131 acquires a commodity ID of a commodity selected by a customer, transmits an update request including the commodity ID to the POS server 11, and causes the POS server 11 to register the commodity as a purchase-scheduled commodity. For example, the registration unit 131 acquires the commodity ID of the purchased commodity by reading a commodity code attached to the commodity through a reading device (not illustrated). The reading device is not particularly limited and is, for example, a scanner connected to the registration device 13. Like the registration unit 121 related to the above-described customer terminal device 12, the registration unit 131 related to the registration device 13 can be modified in various forms by connecting an imaging device or an input device to the registration device 13.

For example, the output unit 133 notifies the number of the settlement device 10 of a transmission destination of settlement information. The display unit 1330 displays the commodity information of the commodity of which the commodity ID is acquired and the purchase commodity list for the store employee or the customer.

Figure 5:
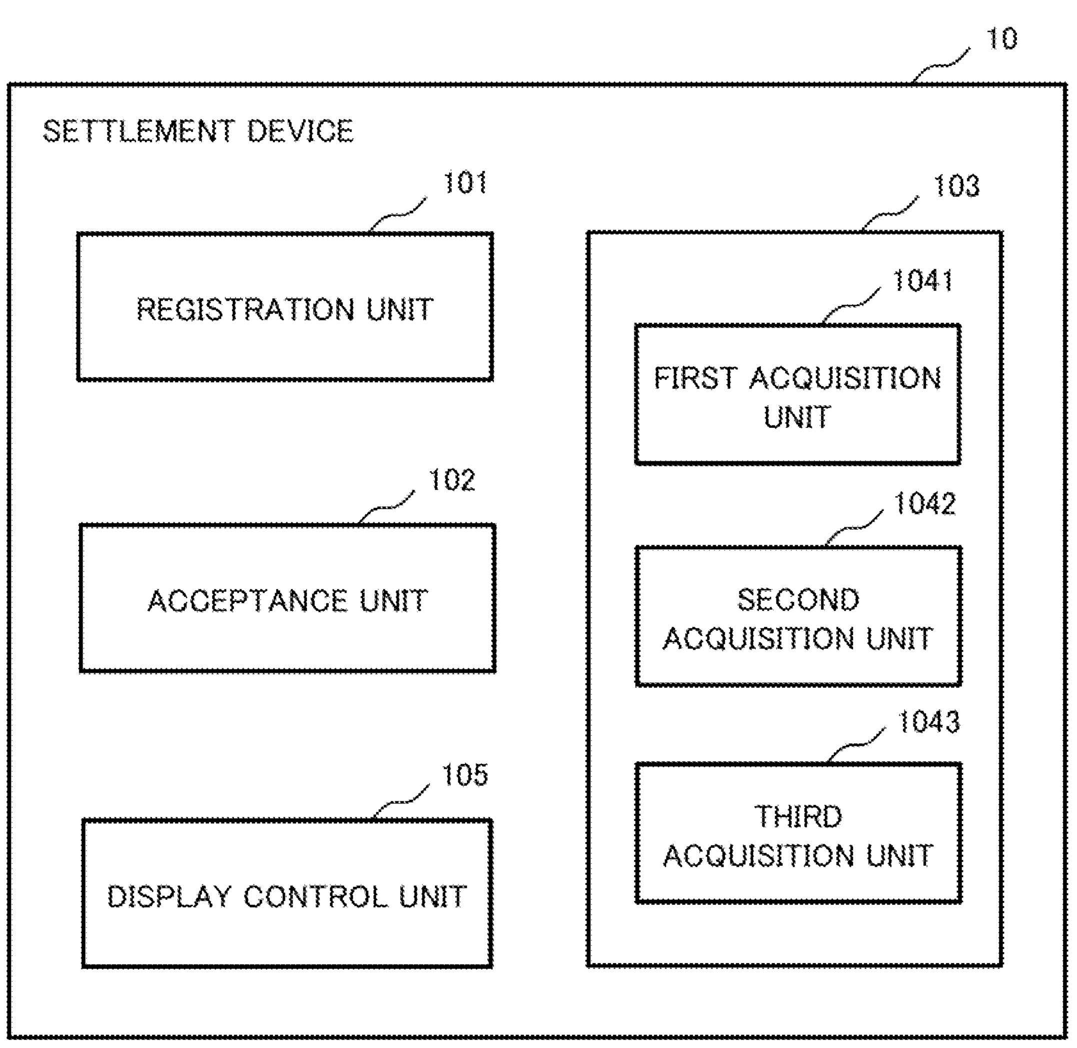
FIG. 5 is a block diagram illustrating a configuration example of a settlement device 10.

FIG. 5 is a block diagram illustrating a configuration example of the settlement device 10. The settlement device 10 includes a registration unit 101, an acceptance unit 102, a settlement unit 103, and a display control unit 105. The settlement unit 103 includes a first acquisition unit 1041, a second acquisition unit 1042, and a third acquisition unit 1043. The first acquisition unit 1041 is an example embodiment of first acquisition means.

The registration unit 101 acquires the commodity ID of the commodity selected by the customer, transmits an update request including the commodity ID to the POS server 11, and causes the POS server 11 to register the commodity as the purchase-scheduled commodity. For example, the registration unit 101 acquires the commodity ID of the purchased commodity by reading the commodity code attached to the commodity via a reading device (not illustrated). The reading device is not particularly limited, but is, for example, a scanner connected to the settlement device 10. Like the registration unit 121 related to the above-described customer terminal device 12, the registration unit 101 related to the settlement device 10 can be modified in various forms by connecting an imaging device or an input device to the settlement device 10. The settlement device 10 transmits the commodity ID acquired by registration unit 101 to the POS server 11.

The acceptance unit 102 accepts a selection indicating whether to perform settlement in accordance with one of the three settlement modes that are the register-less mode, the full self-mode, and the semi-self-mode. The acceptance unit 102 accepts the selection based on the input from the store employee or the customer. The acceptance unit 102 may accept an input of authentication information of the store employee and may accept a selection which is based on the input of the store employee when the authentication which is based on the input authentication information is successful. For example, the acceptance unit 102 may accept an input of a store employee ID, a store employee name, a password, or biometric information as authentication information and may determine that authentication has succeeded when the authentication information matches information stored in the store employee DB 116.

The settlement unit 103 performs a process of acquiring settlement information in the selected settlement mode, and settles the price using the acquired settlement information. The settlement unit 103 performs settlement through either cash settlement or electronic settlement. When the cash payment is performed, the settlement unit 103 performs the settlement based on money inserted into an insertion port provided in the settlement device 10. A type of electronic settlement is not particularly limited. Examples of the electronic settlement include at least one of credit card settlement, debit card settlement, electronic money settlement, point settlement, and virtual currency settlement. The electronic money settlement is, for example, bar code settlement or quick response code (QR code (registered trademark)) settlement. When the electronic settlement is performed, for example, the settlement unit 103 communicates with a settlement server (not illustrated) using credit information acquired via a reading device provided in the settlement device 10 and performs the settlement.

In a case where the register-less mode is selected, the first acquisition unit 1041 performs a first process of acquiring settlement information of a purchased commodity registered using the customer terminal device 12. The case where the register-less mode is selected is an example embodiment of a case where the first process is selected. In a case where the full self-mode is selected, the second acquisition unit 1042 performs a second process of acquiring the settlement information of the purchased commodity registered in the registration unit 101 of the settlement device 10. The case where the full self-mode is selected is an example embodiment of the case where the second process is selected. In a case where the semi-self-mode is selected, the third acquisition unit 1043 executes third process of acquiring the settlement information of the purchased commodity registered using the registration device 13. The case where the semi-self-mode is selected is an example embodiment of the case where the third process is selected. In the first example embodiment, the first acquisition unit 1041, the second acquisition unit 1042, and the third acquisition unit 1043 each acquire settlement information, for example, from the POS server 11. A method of acquiring the settlement information of each of the first acquisition unit 1041, the second acquisition unit 1042, and the third acquisition unit 1043 will be described below.

The display control unit 105 displays a settlement mode selection screen, a commodity registration screen, a payment method selection screen, a payment screen, and the like on, for example, a touch panel display (not illustrated) of the settlement device 10. The display control unit 105 may display a standby screen corresponding to the accepted settlement mode from the selection of the settlement mode by the store employee to start of an operation by the customer. For example, when the register-less mode is accepted, the display control unit 105 may display the settlement code reading screen of “Please scan a settlement code of the terminal device.” When the full self-mode is accepted, for example, the display control unit 105 displays “Please scan commodity code.” When the semi-self-mode is accepted, for example, the display control unit 105 displays “Welcome.”

[Operation]

Figure 6:
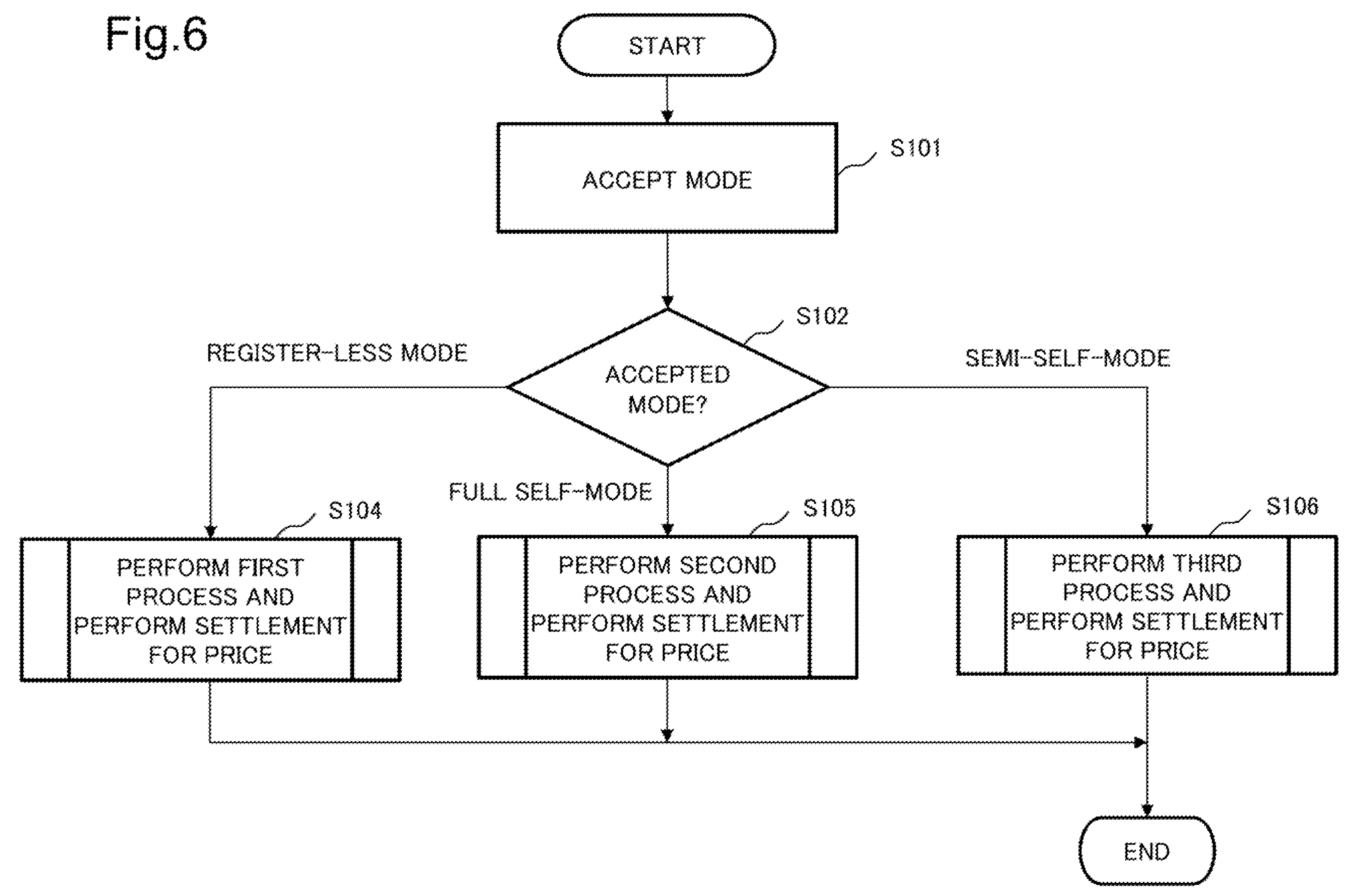
FIG. 6 is a flowchart illustrating an overview of a process of the settlement device.

FIG. 6 is a flowchart illustrating an overview of a process of the settlement device. First, the acceptance unit 102 accepts a selection indicating whether to perform the settlement in accordance with one of the three settlement modes that are the register-less mode, the full self-mode, and the semi-self-mode (step S101).

Figure 7:
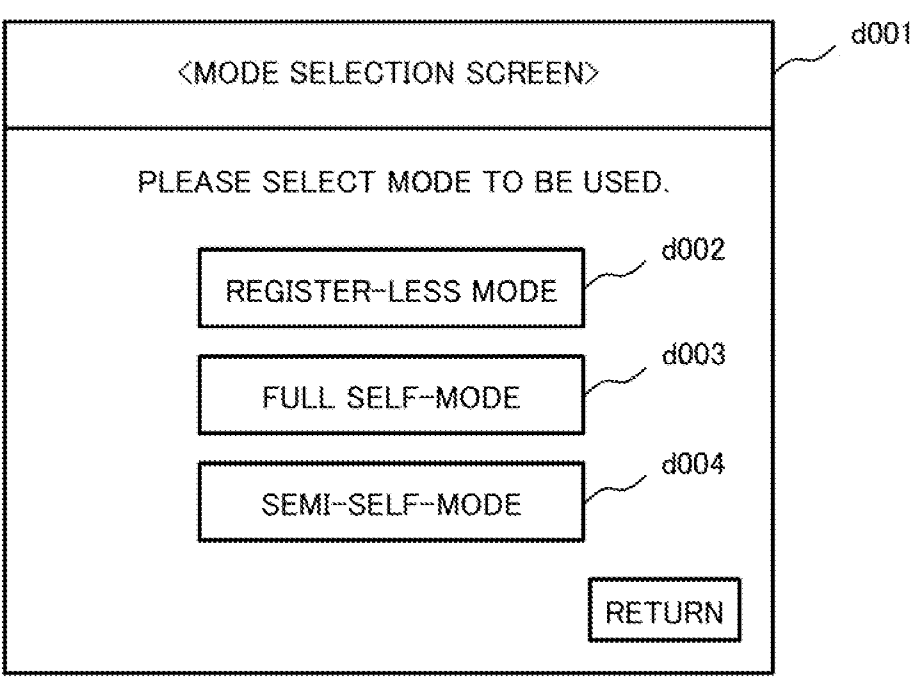
FIG. 7 is a view illustrating an example of a selection screen of a settlement mode.

FIG. 7 is a diagram illustrating an example of a settlement mode selection screen. For example, the display control unit 105 displays a screen d001 on which each mode can be selected, for example, on a display or the like connected to the settlement device 10. The screen d001 includes, for example, a selection button d002 capable of selecting the register-less mode, a selection button d003 capable of selecting the full self-mode, and a selection button d004 capable of selecting the semi-self-mode. Each button is, for example, a button of a graphic user interface (GUI). When the selection button is tapped, the acceptance unit 102 accepts a mode corresponding to the tapped selection button.

When the accepted mode is the register-less mode (step S102: left), the settlement device 10 performs the settlement for a price using the settlement information acquired by performing the first process (step S104). When the accepted mode is the full self-mode (step S102: lower), the settlement device 10 performs the settlement for the price using the settlement information acquired by performing the second process (step S105). When the accepted mode is the semi-self-mode (step S102: right), the settlement device 10 performs the settlement for the price using the settlement information acquired by performing the third process (step S106).

Hereinafter, the process of the information processing system 1 will be described in more detail for each settlement mode of the settlement device 10. First, a case where the settlement device 10 operates in the register-less mode will be described.

1-1) Registration Process Using Customer Terminal Device 12

The registration process will be described using self-scan shopping in which a customer acquires a commodity from a shelf or the like in a store and causes the customer terminal device 12 to read a commodity code as an example. FIG. 8 is a flowchart illustrating an example of a commodity registration process.

The registration unit 121 of the customer terminal device 12 acquires a commodity ID of the purchased commodity by reading a commodity code attached to the commodity or the like, and the customer terminal device 12 transmits an update request including the commodity ID to the POS server 11 (step S1101).

Figure 9:
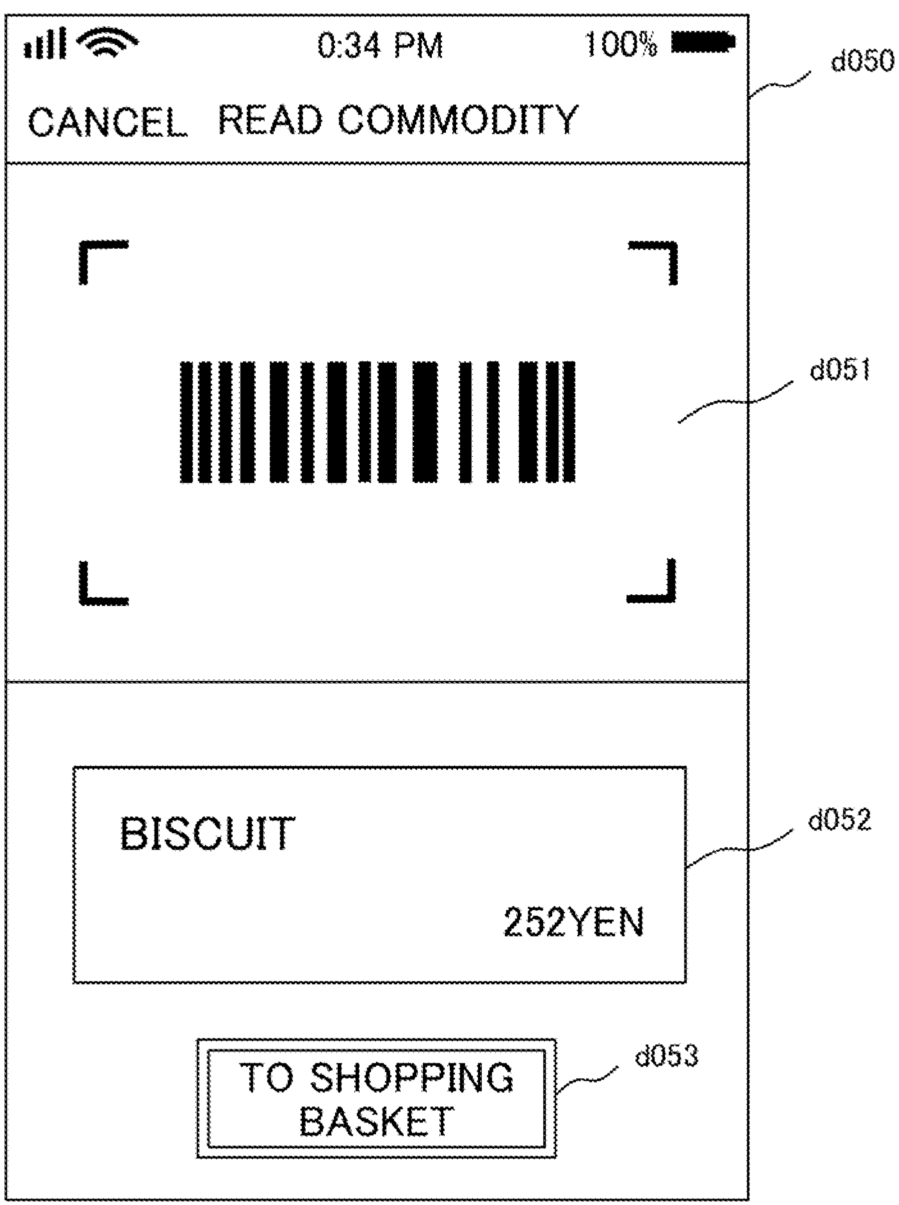
FIG. 9 is a diagram illustrating an example of a commodity registration screen for reading a commodity code.

FIG. 9 is a diagram illustrating an example of a commodity registration screen for reading a commodity code. The display unit 1230 of the customer terminal device 12 displays a screen d050 for reading the commodity code. For example, the screen d050 includes a reading portion d051, a display field d052 for displaying information of a read commodity, and a button d053 for displaying “To shopping basket” for displaying a purchase commodity list. When the commodity code of the imaged commodity is located in a predetermined area of the screen d051, the acquisition unit 121 acquires the commodity ID of the purchased commodity.

The update request may include a member ID of the customer and an ID of the customer terminal device 12 in addition to the commodity ID.

Referring back to FIG. 8, the list generation unit 112 of the POS server 11 updates the purchase commodity list of the customer (step S1102). The POS server 11 transmits the commodity information of the commodity of which the commodity ID has been acquired and the updated purchase commodity list to the customer terminal device 12.

The display unit 1230 of the customer terminal device 12 displays the commodity information related to the acquired commodity ID (step S1103). For example, in FIG. 9, in the display field d052, a biscuit which is the name of a commodity and a price 252 yen of the commodity are displayed in the accepted commodity information.

When the button d053 is not tapped, the registration unit 121 determines that the commodity is to be added (step S1104: Yes), and acquires the commodity ID again. When the button d053 is tapped, the registration unit 121 determines that the commodity is not added (step S1104: No), and the display unit 1230 displays a purchase commodity list (step S1105).

Figure 10:
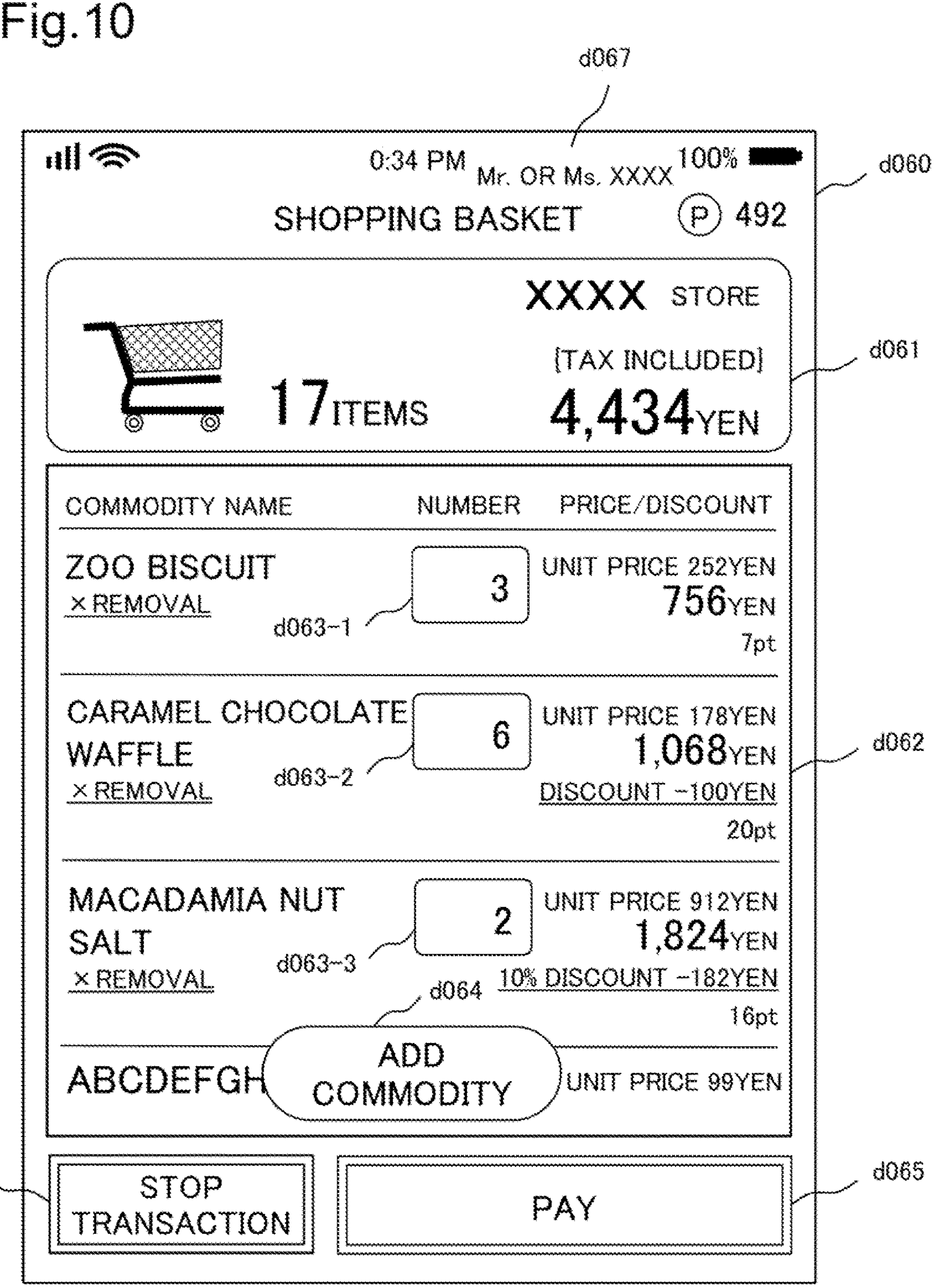
FIG. 10 is a diagram illustrating a display example of a purchase commodity list.

FIG. 10 is a diagram illustrating a display example of a purchase commodity list. The display unit 1230 displays a screen d060 corresponding to the accepted purchase commodity list. The screen d060 includes, for example, a summary field d061 of the purchase commodity list, a detail field d062, a commodity addition button d064, a payment button d065, a transaction stop button d066, and a name display field d067 of the operator. In the summary field d061, for example, information such as a total number of commodities registered in the purchase commodity list, a total purchase price including tax, and a store name is displayed. In the detail field d062, for example, information such as the name of the commodity registered in the purchase commodity list, a purchase number, a unit price, a discount rate, and a discount amount is displayed for each commodity. For example, the detail field d062 may have an input field d063 of the purchase number for each commodity. In the detail field d062, for example, commodity information may also be displayed in order of newest registration. In the detail field d062, for example, a display order of the commodity information may be able to be designated.

When the input field d063 of the purchase number is tapped, the display unit 1230 may display a screen (not illustrated) on which a number can be selected to be superimposed on a part of the screen d060. Then, the registration unit 121 accepts the selected number as a purchase number.

Referring back to FIG. 8, when the number is changed (step S1106: Yes), the customer terminal device 12 transmits the commodity ID of the commodity of which the number has been changed and the accepted purchase number to the POS server 11 (step S1107). Then, the POS server 11 updates the purchase commodity list according to the accepted purchase number (step S1108). The POS server 11 transmits the updated purchase commodity list to the customer terminal device 12. The display unit 1230 displays the updated purchase commodity list (step S1109). A method of changing the purchase number is not particularly limited. For example, although not illustrated, an input field in which the purchase number can be input may be provided on the screen d050 on which the commodity code can be read, as illustrated in FIG. 9.

The registration unit 121 determines whether a commodity is added or the registration of the commodity is ended and the settlement is performed. When the registration unit 121 determines that a commodity is added (step S1110: commodity addition), the process returns to step S1101. For example, when the commodity addition button d064 is pressed on the screen d060 of FIG. 10, the display unit 1230 may display the screen d050 on which a commodity code is read, as illustrated in FIG. 9. When the registration unit 121 determines that the registration of the commodity ends (step S1110: settlement), the output unit 123 generates a settlement request (step S1111), and the customer terminal device 12 moves to the settlement process. For example, when the payment button d065 is pressed in FIG. 10, the registration unit 121 determines that the registration of the commodity ends.

1-2) Settlement Process in Register-Less Mode

FIG. 11 is a flowchart illustrating an example of a settlement process performed after the registration process by the customer terminal device 12.

In the settlement process, the customer terminal device 12 transmits a settlement request to the POS server 11 (step S1112). For example, when the settlement request is accepted, the settlement information generation unit 111 of the POS server 11 generates and the settlement code and the settlement information which is based on the purchase commodity list of the customer (step S1113). The POS server 11 transmits the settlement code to the customer terminal device 12 (step S1114). The customer terminal device 12 displays the accepted settlement code (step S1115).

Figure 12:
FIG. 12 is an example of a display screen of a settlement code.

FIG. 12 is an example of a display screen of a barcode encoding a settlement code. For example, a screen d090 of FIG. 12 includes a display field d091 of the settlement code, a display field d093 of a total number, and a display field d094 of a purchase price. A total purchase number of commodities purchased by a customer is displayed in the display field d093 of a total number. In the display field d094 of the purchase price, for example, a total price of the commodities purchased by the customer, including tax is displayed. The screen d090 has a completion button d092 that is tapped after the settlement ends.

Referring back to FIG. 11, the customer carrying the customer terminal device 12 moves to the settlement device 10 accepting the register-less mode in step S101 of the flowchart of FIG. 6. For example, the settlement code reading screen is displayed on the display of the settlement device 10 that has accepted the register-less mode.

The first acquisition unit 1041 of the settlement device 10 acquires a settlement code read with the reading device (not illustrated) and displayed on the customer terminal device 12 (step S1116), and the settlement device 10 transmits the settlement code to the POS server 11. The settlement information generation unit 111 of the POS server 11 generates settlement information associated with the settlement code, and the POS server 11 transmits the generated settlement information to the customer terminal device 12 (step S1117). The first acquisition unit 1041 acquires the settlement information. As described above, the process in which the settlement device 10 acquiring the settlement code and acquiring the settlement information associated with the settlement code from the POS server 11 is an example embodiment of the first process.

When the settlement code is read and the settlement information is acquired, the display control unit 105 displays the payment method selection screen (step S1118). On the payment method selection screen, for example, whether to perform the price by cash payment or electronic payment is displayed in a selectable manner. After the payment method is selected, the display control unit 105 may display a payment screen on which information necessary for settlement is displayed. The settlement unit 103 performs the settlement for the price in accordance with the selected payment method (step S1119), and notifies the POS server 11 that the settlement has been completed. When the notification is accepted, the POS server 11 may update the sales DB 118. When the settlement is completed, the settlement unit 103 may issue a receipt (step S1120) and cause a printer (not illustrated) connected to the settlement device 10 to print the receipt. Alternatively, the settlement unit 103 may output an electronic receipt to the customer terminal device 12 via the network. The receipt includes, for example, a purchase item name, a purchase number, a purchase price, a payment method, a store name, a contact address of a store, and a purchase date and time. The receipt may include a customer ID. The receipt may include information other than the above-described information.

The process of the information processing system 1 when the settlement device 10 operates in the register-less mode has been described above. Next, a process of the information processing system 1 when the settlement device 10 operates in the full self-mode will be described.

2-1) Registration Process Using Settlement Device 10

A case where a customer goes to the settlement device 10 and registers the commodity by himself or herself after acquiring the commodity from a shelf or the like in a store will be described. The customer carrying the acquired commodity moves to the settlement device 10 in which the full self-mode is accepted in step S101 of FIG. 6. In the settlement device 10, the customer causes a reading device to read a commodity code or the like attached to the commodity.

Figure 13:
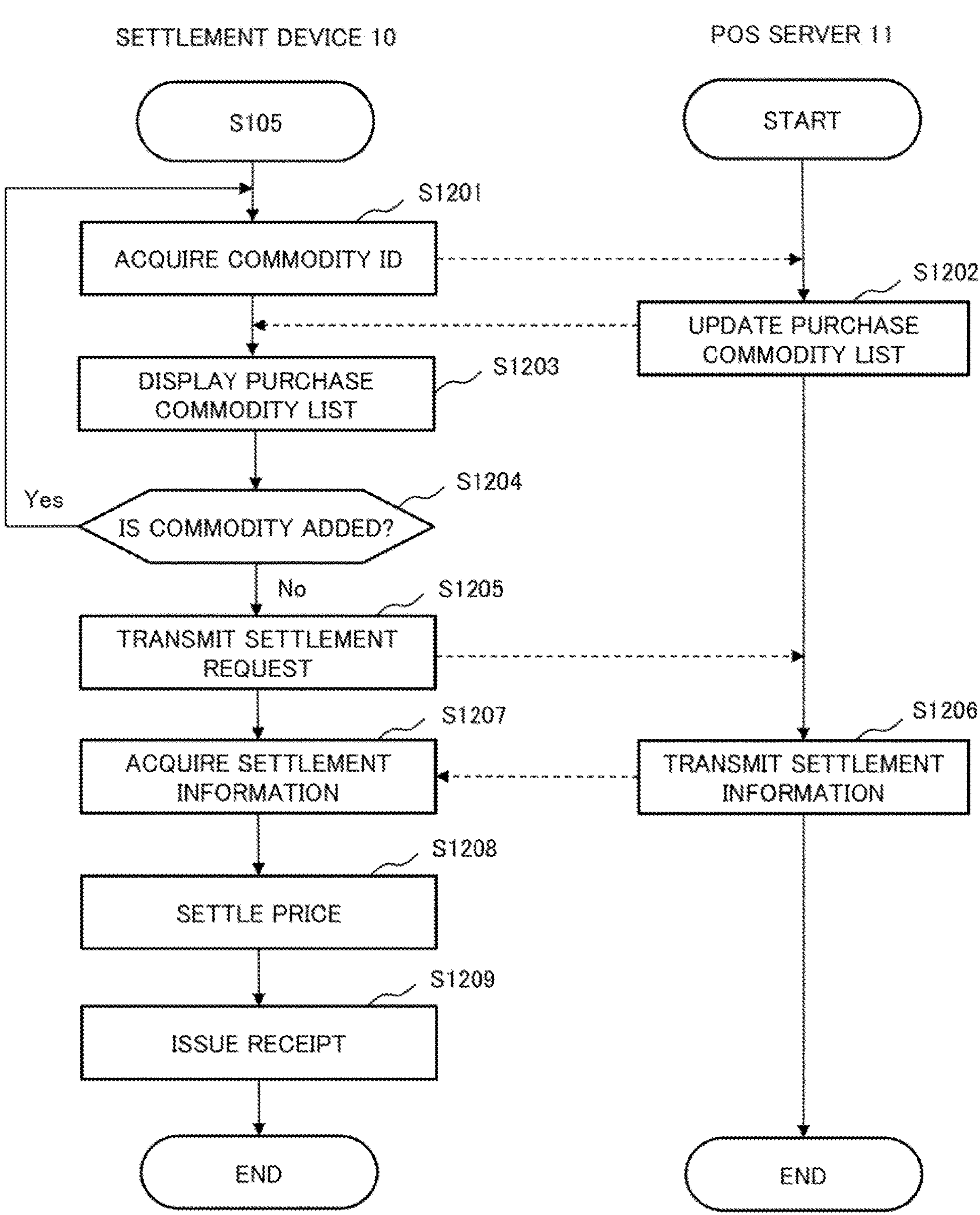
FIG. 13 is a flowchart illustrating examples of a registration process and a settlement process.

FIG. 13 is a flowchart illustrating examples of a registration process and a settlement process. The registration unit 101 acquires the commodity ID (step S1201), and the settlement device 10 transmits an update request including the commodity ID to the POS server 11. In addition to the commodity ID, the update request may include a member ID of the customer and an ID of the settlement device 10. The list generation unit 112 of the POS server 11 updates the purchase commodity list of the customer (step S1202). The POS server 11 transmits the commodity information of the commodity of which the commodity ID has been acquired and the updated purchase commodity list to the settlement device 10. The display control unit 105 of the settlement device 10 displays the purchase commodity list (step S1203). The display control unit 105 may display the commodity information and the purchase commodity list as a registration commodity screen.

Figure 14:
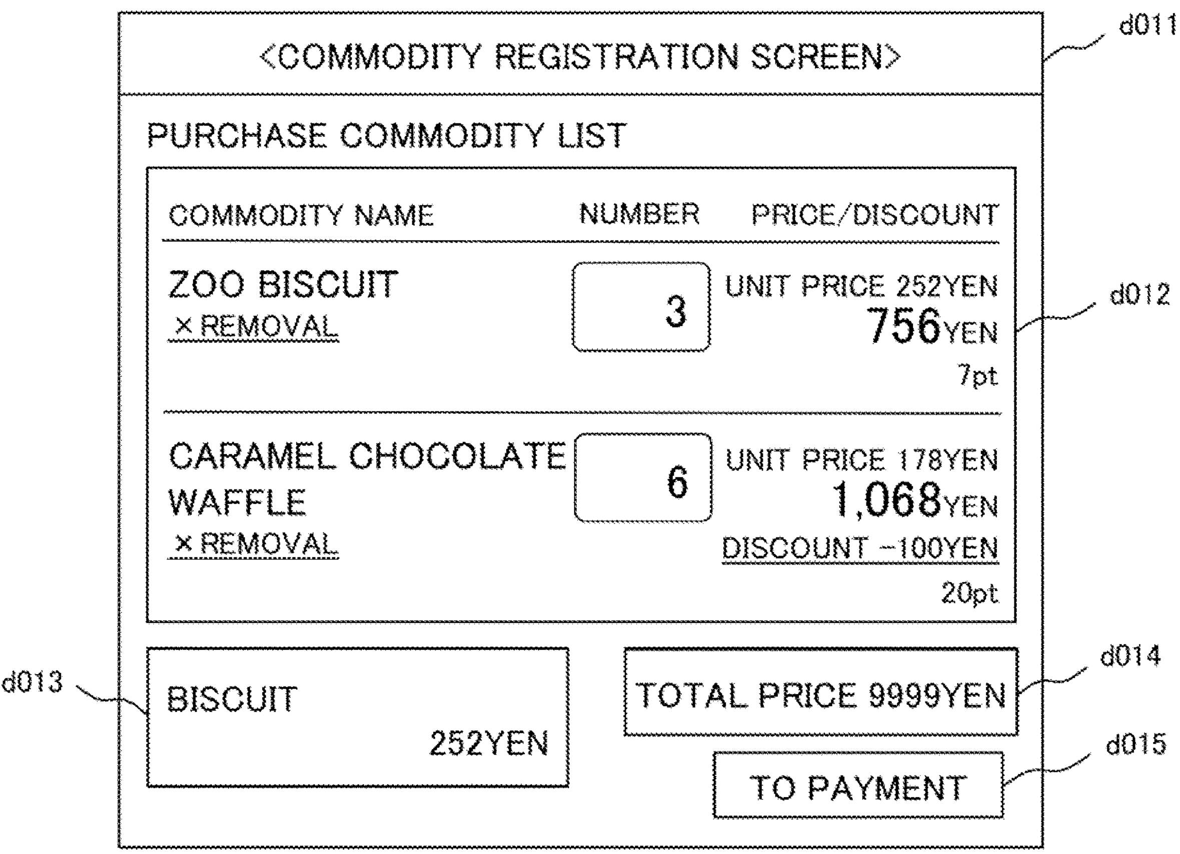
FIG. 14 is a diagram illustrating an example of a commodity registration screen.

FIG. 14 is a diagram illustrating an example of a commodity registration screen. The display control unit 105 displays a screen d011 on the display. For example, the screen d011 includes a display field d012 for displaying a purchase commodity list, a display field d013 for displaying commodity information of a commodity of which a commodity ID has been read, a display field d014 for a total purchase price including tax, and a settlement button (1015. When the commodity ID of the first commodity is acquired, the display control unit 105 may switch the display from the standby screen to the commodity registration screen illustrated in FIG. 14. When the settlement button d015 displayed on the screen has not been tapped, the second acquisition unit 1042 determines that the commodity is added (step S1204: No) and acquires the commodity ID again.

2-2) Settlement Process in Full Self-Mode

Referring back to FIG. 13, when the settlement button d015 is tapped, the registration unit 101 determines that the commodity has not been added (step S1204: No), and the settlement device 10 transmits a settlement request to the POS server 11 (step S1205). The POS server 11 transmits settlement information to the settlement device 10 based on the settlement request (step S1206). The second acquisition unit 1042 acquires the settlement information accepted from POS server 11 (step S1207). The process from step S1201 to step S1207 is an example embodiment of the second process. The process after the acquisition of the settlement information is basically similar to that of the case of the above-described register-less mode. The settlement unit 103 performs the settlement for the price using the acquired settlement information (step S1208) and issues a receipt (step S1209).

The process of the information processing system 1 when the settlement device 10 operates in the full self-mode has been described above. Next, a process of the information processing system 1 when the settlement device 10 operates in the semi-self-mode will be described.

3-1) Registration Process Using Registration Device 13

A case in which, after a customer finishes acquisition of a commodity from a shelf or the like in a store, the customer goes to the registration device 13 and a store employee registers the commodity will be described.

FIG. 15 is a flowchart illustrating examples of a registration process and a settlement process. Like the registration unit 101 of the settlement device, the registration unit 131 of the registration device 13 acquires the commodity ID, and the registration device 13 transmits an update request including the commodity ID to the POS server 11 (step S1301). In addition to the commodity ID, the update request may include a member ID of the customer and an ID of the registration device 13. The list generation unit 112 of the POS server 11 updates the purchase commodity list of the customer (step S1202). The POS server 11 transmits the commodity information of the commodity of which the commodity ID has been acquired and the updated purchase commodity list to the registration device 13. The display unit 1330 of the registration device 13 displays the purchase commodity list (step S1303). When the commodity has been added (step S1304: Yes), the registration unit 131 acquires the commodity ID again. When the commodity has not been added (step S1304: No), the registration device 13 transmits a settlement request to the POS server 11. In this way, the registration device 13 completes the commodity registration process.

3-2) Settlement Process in Semi-Self-Mode

When the POS server 11 accepts the settlement request, the information processing system 1 starts the settlement process. The POS server 11 transmits the settlement information to the settlement device 10 accepting the semi-self-mode in step S101 of FIG. 6 (step S1305). The customer moves to the settlement device 10 to which the settlement information has been transmitted.

When there are the plurality of settlement devices 10, the settlement device 10 transmitting the settlement information can be selected in accordance with any method. For example, the POS server 11 automatically selects the settlement device 10 in a free state and transmits the settlement information. The display unit 1330 of the registration device 13 displays the number of the settlement device 10 of a transmission destination of the settlement information, and the like. Accordingly, the store employee notifies the customer of the number of the settlement device 10 and the like, and the customer moves to the settlement device 10 designated by the store employee.

The third acquisition unit 1043 of the settlement device 10 acquires the settlement information from the POS server 11 (step S1306). The process in step S1306 is an example embodiment of the third process. The process after the acquisition of the settlement information is basically similar to that of the case of the above-described register-less mode and full self-mode. The display control unit 105 displays the payment method selection screen (step S1307). The display control unit 105 may display the payment method selection screen immediately after acceptance of the settlement information. Alternatively, the display control unit 105 may first display a standby screen or the like including an accounting start button and display the payment method selection screen after the customer presses the accounting start button. The settlement unit 103 performs the settlement for the price using the acquired settlement information (step S1308) and issues the receipt (step S1309).

The process of the information processing system 1 when the settlement device 10 operates in the semi-self-mode has been described above. The process of the information processing system 1 has been described above.

Modified Examples

The function of the settlement information generation unit 111 or the list generation unit 112 of the POS server 11 may be included in the customer terminal device 12, the settlement device 10, or the registration device 13. In this case, the registration unit 121 of the customer terminal device 12, the registration unit 101 of the settlement device 10, or the registration unit 131 of the registration device 13 generates the settlement information or the purchase commodity list, and stores the generated settlement information or purchase commodity list in the POS server 11.

In the first example embodiment, the case where the first acquisition unit 1041 acquires the settlement code displayed on the customer terminal device 12 and acquires the settlement information associated with the settlement code from the POS server 11 has been described. However, the first acquisition unit 1041 may acquire the settlement information from POS server 11 in accordance with another method. For example, the display control unit 105 first displays a code obtained by encoding the identification information of the settlement device 10 on a display. After step S1112, the customer terminal device 12 transmits the identification information of the settlement device 10 read from the code displayed on the settlement device 10 to the POS server 11 along with information for uniquely identifying the settlement information. The information for uniquely identifying the settlement information is, for example, a customer ID, an ID of the customer terminal device 12, a member ID, or the like. The POS server 11 transmits, to the settlement device 10, the settlement information of the commodity registered in the customer terminal device 12 that has read the identification information of the settlement device 10.

The first acquisition unit 1041 may acquire the settlement information from the customer terminal device 12. In this case, the first acquisition unit 1041 may acquire the settlement information generated in the customer terminal device 12 from the customer terminal device 12. Alternatively, the first acquisition unit 1041 may acquire the settlement information generated in POS server 11 and transmitted to customer terminal device 12. The output unit 123 of the customer terminal device 12 may transmit the settlement information to the settlement device 10 through wireless communication in accordance with the near field communication (NFC), Wi-Fi (registered trademark), Bluetooth (registered trademark), or the like. Alternatively, the display unit 1230 of the customer terminal device 12 may display a code obtained by encoding the settlement information instead of the settlement code, and cause the reading device of the settlement device 10 to read the code. In this case, the settlement device 10 reads the code and acquires the settlement information. The process of acquiring the settlement information from the customer terminal device 12 is an example embodiment of the first process.

The second acquisition unit 1042 may acquire the settlement information generated by settlement device 10. The process of acquiring the settlement information generated in the settlement device 10 is an example embodiment of the second process.

The third acquisition unit 1043 may acquire the settlement information from the registration device 13 through communication. In this case, the third acquisition unit 1043 may acquire the settlement information generated in the registration device 13 from the registration device 13. Alternatively, third acquisition unit 1043 may acquire the settlement information generated in POS server 11 and transmitted to registration device 13.

The third acquisition unit 1043 may acquire a settlement code and acquire the settlement information associated with the settlement code from the POS server 11. Here, the settlement code may be printed by a printing device connected to the registration device 13. The customer accepts the printed settlement code from the store employee and causes the reading device of the settlement device 10 to read the settlement code. Alternatively, the settlement code may be transmitted from the registration device 13 or the POS server 11 to the customer terminal device 12. In this case, the third acquisition unit 1043 acquires the settlement code output by the output unit 123 of the customer terminal device 12 in accordance with an arbitrary method.

In the first example embodiment, the settlement device 10 with which the settlement is performed through an operation of a customer has been described. A direction of the settlement device 10 may be rotatable in accordance with whether the settlement device 10 faces the store employee side or the customer side. That is, when the settlement device 10 faces the store employee, the store employee operates the settlement device 10 to perform the settlement for the price or the registration of the commodity and the settlement for the price. When the settlement device 10 faces the customer, the customer operates the settlement device 10 to register the commodity and/or settle the price. In a register that has a settlement function, a register facing the store employee is also called a manned register. The register facing the customer is also called an unattended register. That is, the settlement device 10 according to the present disclosure may be a register that switches between manned and unmanned states. The settlement device 10 may switch an operation mode between the time of facing the store employee and the time of facing the customer. The register-less mode, the full self-mode, and the semi-self-mode in the first example embodiment are customer operation modes when the settlement device 10 faces the customer. For example, the settlement device 10 operates in an operation mode for the store employee when settlement device 10 faces the store employee and displays a screen for requesting an input of the store employee ID or information for the store employee.

[Effects]

According to the first example embodiment, for example, the settlement can be performed in any of a case where a commodity is registered by the customer terminal device 12, a case where a commodity is registered by the settlement device 10, and a case where a commodity is registered by the registration device 13. For example, by switching the mode of the settlement device 10 for each mode of the registration process, it is not necessary to install the settlement device individually corresponding to each mode of the registration process in the store. Accordingly, the store can be efficiently operated. For example, according to the first example embodiment, even when an output format of the settlement information is different for each mode of the registration process, it is possible to smoothly transition to the settlement process.

This is because the acceptance unit 102 accepts a selection to perform the settlement in accordance with one of the three settlement modes that are the register-less mode, the full self-mode, and the semi-self-mode. This is because the settlement unit 103 performs a process of acquiring the settlement information in accordance with the selected settlement mode, and performs the settlement for the price using the acquired settlement information.

Second Example Embodiment

Figure 16:
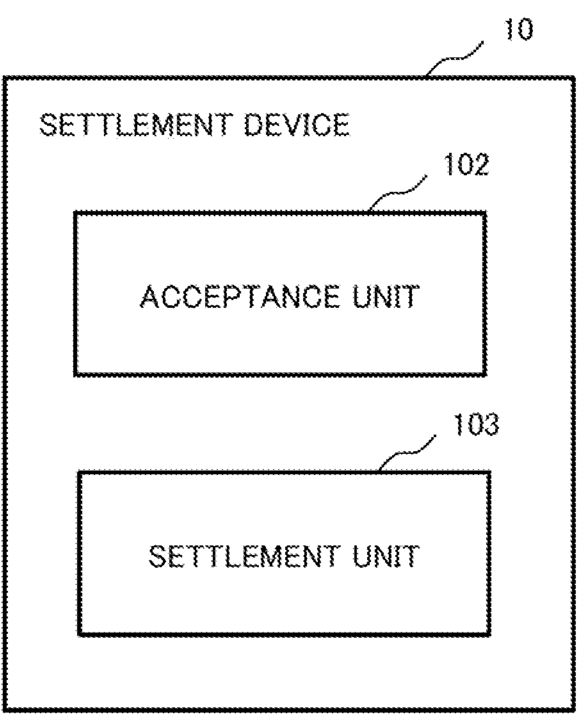
FIG. 16 is a block diagram illustrating a basic configuration of the settlement device 10.

Next, a second example embodiment will be described in detail with reference to the drawings. In the second example embodiment, a basic configuration of the content described in the first example embodiment will be described. FIG. 16 is a block diagram illustrating a basic configuration of the settlement device 10. The settlement device includes the acceptance unit 102 and the settlement unit 103. The acceptance unit 102 and the settlement unit 103 are example embodiments of acceptance means and settlement means, respectively.

The acceptance unit 102 accepts a selection of one of the first, second, and third processes. The first process is a process of acquiring settlement information of a commodity registered using a terminal device used by a customer. The second process is a process of acquiring the settlement information of the commodity registered by the settlement device 10 through an operation of the customer. The third process is a process of acquiring the settlement information of the commodity registered using the registration device that registers the commodity by the operation of the store employee. The settlement unit 103 performs one of the selected first, second, or third process to acquire the settlement information. The settlement unit 103 performs the settlement for the price based on the acquired settlement information.

Figure 17:
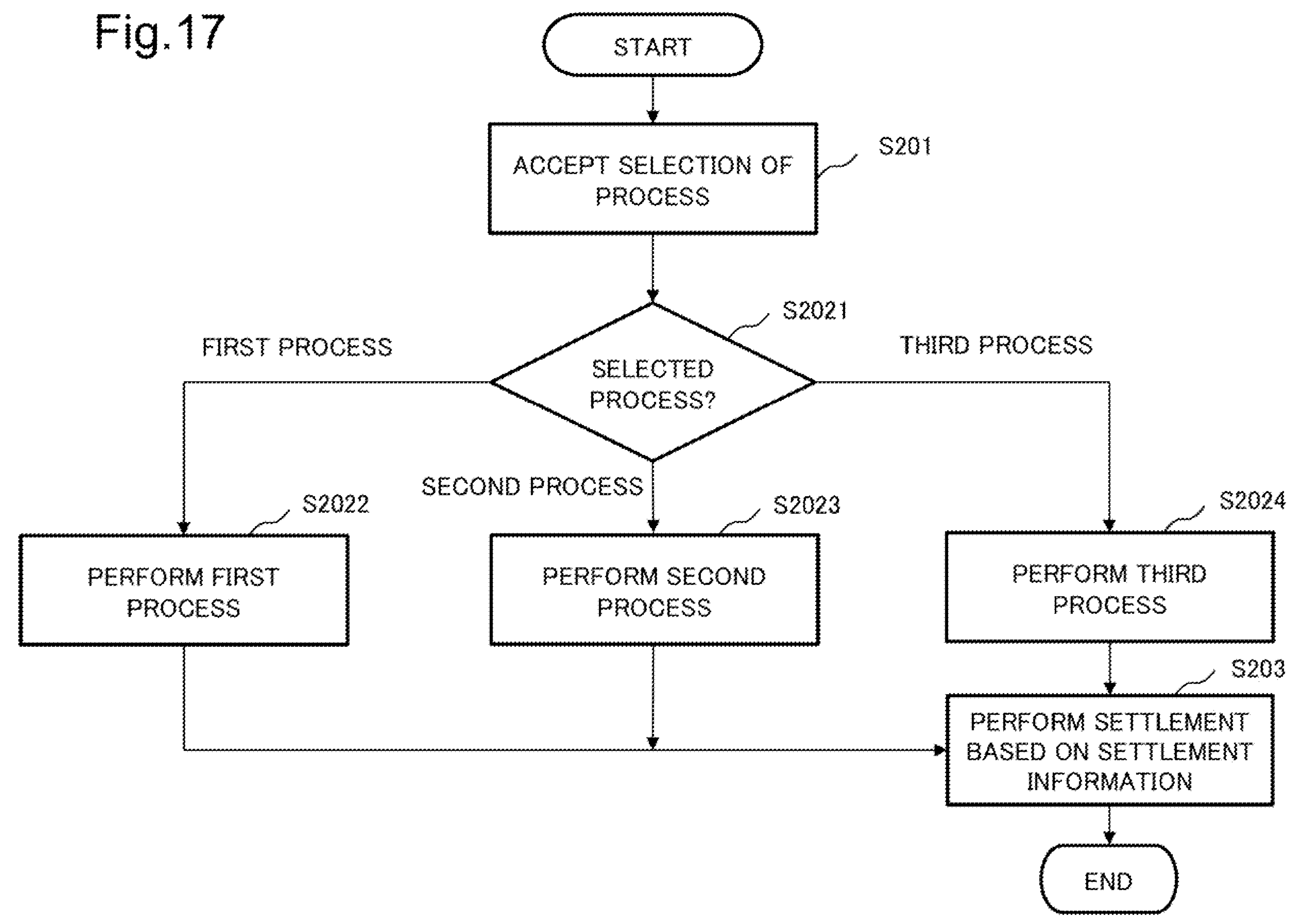
FIG. 17 is a flowchart illustrating a basic operation of the settlement device 10.

FIG. 17 is a flowchart illustrating the basic operation of the settlement device 10. The acceptance unit 102 accepts a selection of one of the first, second, and third processes (step S201). When the selection of the first process is accepted, the settlement unit 103 performs the first process and acquires the settlement information (step S2022). When the selection of the second process is accepted, the settlement unit 103 performs the second process and acquires the settlement information (step S2023). When the selection of the third process is accepted, the settlement unit 103 performs the third process and acquires the settlement information (step S2024). Thereafter, the settlement unit 103 performs the settlement for the price based on the acquired settlement information (step S203).

[Effects]

According to the second example embodiment, it is possible to handle the settlement even when commodities are registered in various modes.

(Hardware Configuration)

Figure 18:
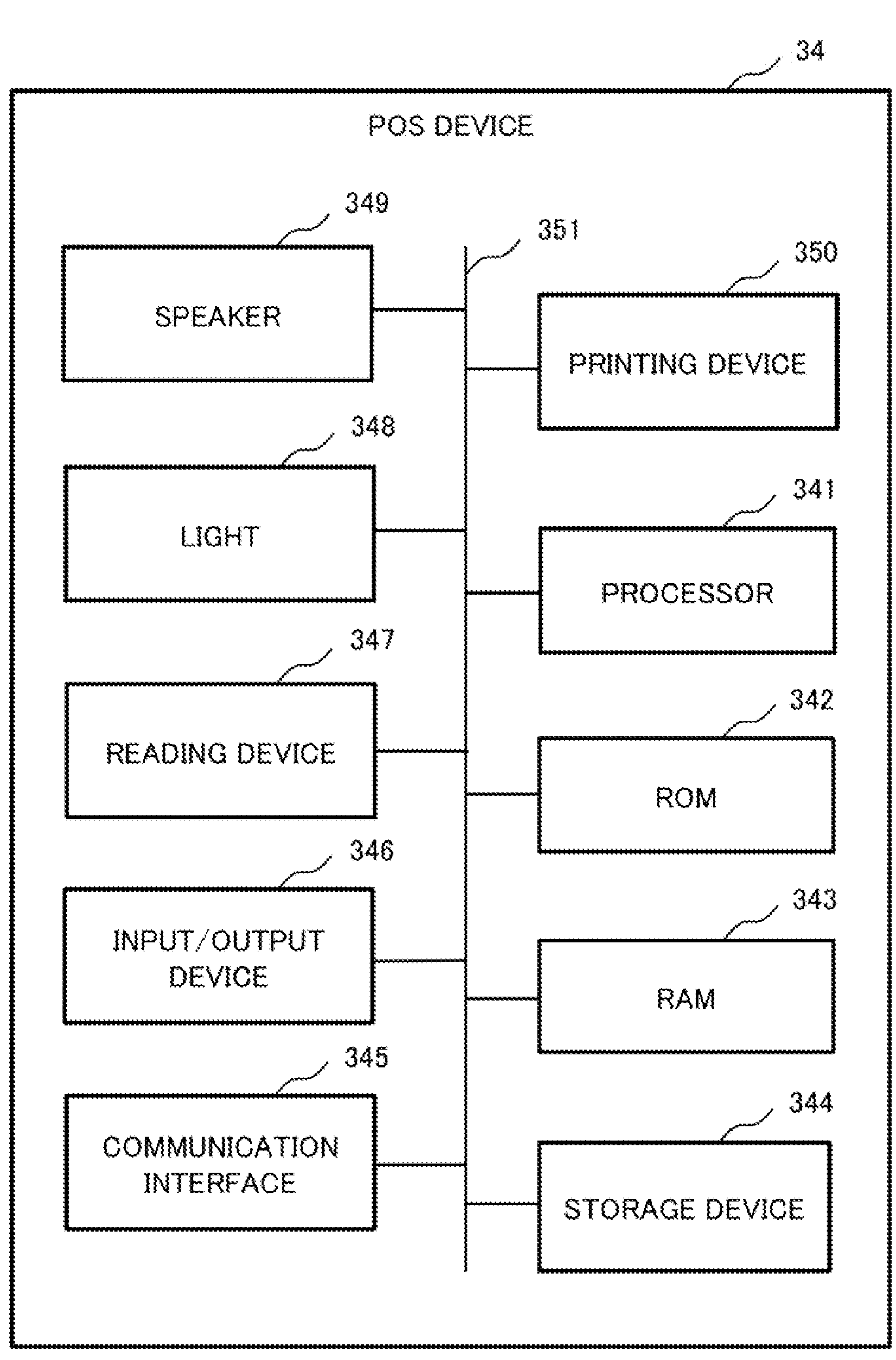
FIG. 18 is a diagram illustrating a hardware configuration example of a POS device 34.
Figure 19:
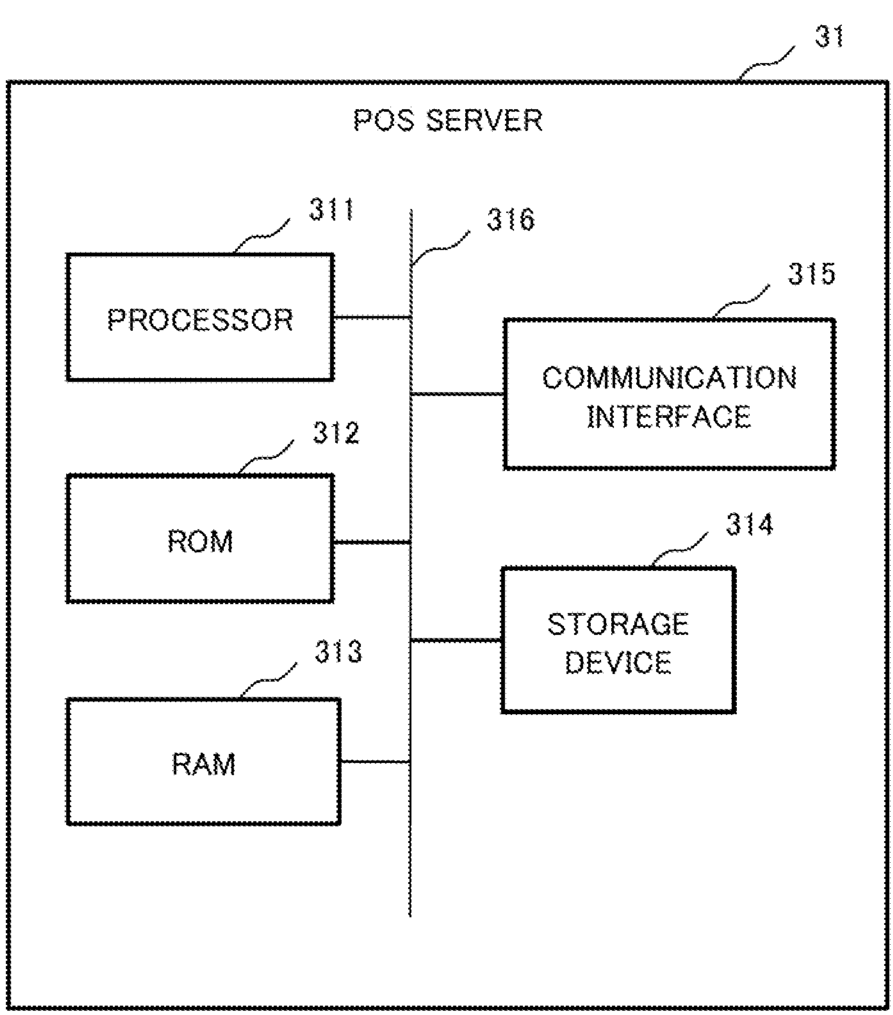
FIG. 19 is a diagram illustrating a hardware configuration example of a POS server 31.
Figure 20:
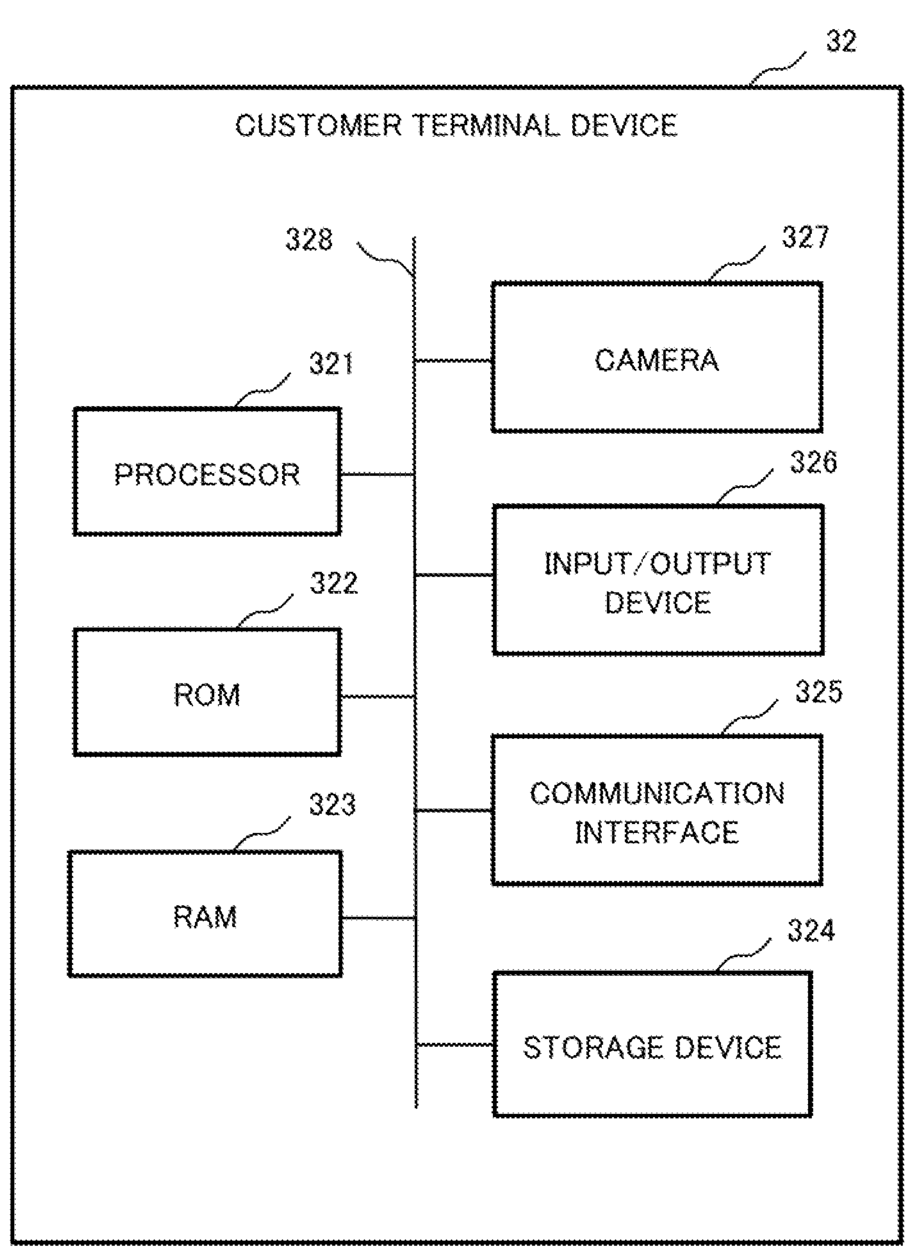
FIG. 20 is a diagram illustrating a hardware configuration example of a customer terminal device 32.

Each example embodiment has been described above. Next, hardware configurations of the settlement device 10, the POS server 11, the customer terminal device 12, and the registration device 13 will be described. FIGS. 18, 19, and 20 are diagrams illustrating a hardware configuration example of the system.

First, a hardware configuration example of the POS device 34 illustrated in FIG. 18 will be described. For example, the POS device 34 is an example in which settlement device 10 and registration device 13 according to the first and second example embodiments are implemented by a computer. The POS device 34 includes, for example, a processor 341, a ROM 342, a RAM 343, a storage device 344, and a communication interface 345. The POS device 34 further includes a communication interface 345, an input/output device 346, a reading device 347, a light 348, a speaker 349, and a printing device 350. The constituent units are connected by a bus 351.

The input/output device 346 accepts an input performed through an operation of a customer or an operation of a store employee. The input/output device 346 outputs data. The input/output device 346 may display an image. The input/output device 346 is, for example, a touch panel display.

The reading device 347 is, for example, a device capable of reading a settlement code such as a 1-dimensional code or a 2-dimensional code. Examples of the reading device 347 include a barcode reader and an imaging device. The reading device 347 may also be an RFID reader capable of reading an RFID.

The light 348 is, for example, an output device that is turned on. The light 348 is turned on when the settlement device 10 is abnormal, when a store employee is called, or the like. The speaker 349 is, for example, an output device that outputs an operation sound, a voice message, or the like. The printing device 350 is, for example, an output device capable of printing a receipt.

Next, a hardware configuration example of the POS server 31 illustrated in FIG. 19 will be described. The POS server 31 is an example in which the POS server 11 described in the first example embodiment is implemented by a computer. The POS server 31 includes, for example, a processor 311, a ROM 312, a RAM 313, a storage device 314, and a communication interface 315.

Next, a hardware configuration example of the customer terminal device 32 illustrated in FIG. 20 will be described. The customer terminal device 32 is an example in which the customer terminal device 12 described in the first example embodiment is implemented by a computer. The customer terminal device 32 includes a processor 321, a ROM 322, a RAM 323, a storage device 324, a communication interface 325, an input/output device 326, and a camera 327. The constituent units are connected via a bus 328. Each constituent unit of customer terminal device 32 is connected via bus 328.

The processors 341, 311, and 321 control the entire POS device 34, the entire POS server 31, or the entire customer terminal device 32. Examples of the processors 341, 311, and 321 include a central processing unit (CPU) and a digital signal processor (DSP). The POS device 34, the POS server 31, and the customer terminal device 32 include, as storage units, the ROMs 342, 312, and 322, the RAMs 343, 313, and 323, and the storage devices 344, 314, and 324. Examples of the storage devices 344, 314, and 324 include a semiconductor memory such as a flash memory, an HDD, and an SSD. For example, the storage devices 344, 314, and 324 store an operating system (OS) program, an application program, and the like. Alternatively, the ROMs 342, 312, and 322 store an application program. The RAMs 343, 313, and 323 are used as working areas of the processors 341, 311, and 321.

The processors 341, 311, and 321 load programs stored in the storage devices 344, 314, and 324, the ROMs 342, 312, and 322, and the like. Then, the processors 341, 311, and 321 perform each process coded in the programs. The processors 341, 311, and 321 may download various programs via a communication network. The processors 341, 311, and 321 function as some or all of the POS device 34, the POS server 31, or the customer terminal device 32. Then, the processors 341, 311, and 321 may perform the processes or the instructions in the illustrated flowcharts based on the programs.

The communication interfaces 345, 315, and 325 are connected to a communication network such as a local area network (LAN) or a wide area network (WAN) via a wireless or wired communication line. Accordingly, the POS device 34, the POS server 31, and the customer terminal device 32 are connected to an external device or an external computer via the communication network. The communication interfaces 345, 315, and 325 manage interfaces between the communication network and the inside of the POS device 34, the POS server 31, and the customer terminal device 32. Then, the communication interfaces 345, 315, and 325 control an input and an output of data to and from an external device or an external computer.

The hardware configurations illustrated in FIGS. 18, 19, and 20 are exemplary. Constituent units other than the constituent units illustrated in the drawings may be added, or some of the constituent units may not be included. For example, the POS device 34 may include an input device such as a keyboard, a mouse, and a physical button. The POS device 34 may not include the printing device 350. For example, the printing device 350 may be externally attached. Alternatively, the printing device 350 may be connected via a communication network.

The hardware configuration of each device has been described above. There are various modified examples in a method of implementing each device. For example, the system may be implemented by any combination of a computer and a program different for each constituent unit. A plurality of constituent units included in each device may be implemented in any combination of one computer and programs.

Some or all of the constituent units of the system may be implemented by an application specific circuit. Some or all of the systems may be implemented by a general-purpose circuit including a processor such as a field programmable gate array (FPGA). Some or all of the systems may be implemented by combining an application specific circuit, a general-purpose circuit, and the like. These circuits may be a single integrated circuit. Alternatively, these circuits may be divided into a plurality of integrated circuits. The plurality of integrated circuits may be configured by being connected via a bus or the like.

In addition, when some or all of the constituent units of each device are implemented by a plurality of computers, circuits, or the like, the plurality of computers, circuits, and the like may be arranged in a centralized manner or in a distributed manner.

The methods described in the example embodiments can be implemented by the settlement device, the POS server, the customer terminal device, or the registration device. The method is implemented by a computer such as a settlement device, a POS server, a customer terminal device, or a registration device executing a program prepared in advance. The program is recorded on a computer-readable recording medium such as an HDD, an SSD, a flexible disk, an optical disk, a flexible disk, a magnetic optical disk, or a USB memory. Then, the program is executed by being read from the recording medium by the computer. The program may be distributed via a communication network.

The functions of the constituent units of the system according to each example embodiment described above may be implemented as hardware like the computer system illustrated in FIGS. 18 to 20. Alternatively, each constituent unit may be implemented by a computer device or firmware based on program control.

Although the present invention has been described with reference to the example embodiments, the present invention is not limited to the example embodiments. The configurations and details of the present invention may include example embodiments to which various changes that can be ascertained by those skilled in the art within the scope of the present invention are applied. The present invention may include example embodiments in which the matters described in the present specification are appropriately combined or replaced as necessary. For example, the matters described using a specific example embodiment can be applied to other example embodiments as long as no contradiction occurs. For example, although the plurality of operations are described in order in the form of a flowchart, the order of description does not limit the order of executing the plurality of operations. Therefore, when each example embodiment is implemented, the order of the plurality of operations can be changed within a range that does not interfere with the content.

REFERENCE SIGNS LIST

1 Information processing system
10 Settlement device
11 POS server
12 Customer terminal device
13 Registration device
16 Communication network
101 Registration unit
102 Reception unit
103 Settlement unit
105 Display control unit
111 Settlement information generation unit
112 List generation unit
113 Sales management unit
114 Storage unit
121 Registration unit
123 Output unit
131 Registration unit
133 Output unit

What is claimed is:

1. A settlement device comprising:
- a touch screen display;
- a code scanner;
- at least one memory configured to store instructions; and
- at least one processor configured to execute the instructions to:
  - display, on the touch screen display, a settlement mode selection screen including selection buttons for a first process, a second process, and a third process;
  - accept a selection of one of the first process of acquiring settlement information of a commodity registered using a terminal device used by a customer, the second process of acquiring settlement information of a commodity registered by the settlement device having a registration function of registering the commodity through an operation of the customer, or the third process of acquiring settlement information of a commodity registered using a registration device that registers the commodity through an operation of a store employee;
  - in a case where the first process is selected:
    - display, on the touch screen display, a settlement reading screen requesting at least one of: reading of a settlement code displayed on the terminal device using the code scanner, or reading of identification information of the settlement device using the terminal device;
  - in a case where the second process is selected:
    - display, on the touch screen display, a commodity reading screen requesting reading of a commodity code using the code scanner, and
    - in a case where the commodity code is read, switch the commodity reading screen to a commodity registration screen;
  - in a case of the settlement code being read, the reading of the commodity code being completed, or the settlement information being acquired from the registration device, display a payment method selection screen on the touch screen display;
  - accept a selection of a payment method from the payment method selection screen; and
  - perform the selected one of the first process, the second process, or the third process and perform settlement for a price at the settlement device using the acquired settlement information and the selected payment method.

2. The settlement device according to claim 1, wherein the at least one processor is further configured to execute the instructions to:
- acquire the settlement information associated with the settlement code from a server based on the settlement code acquired from the terminal device when the first process is selected.

3. The settlement device according to claim 1, wherein the at least one processor is further configured to execute the instructions to:
- acquire, from a server, the settlement information of the terminal device that read the identification information of the settlement device displayed.

4. The settlement device according to claim 1, wherein the at least one processor is further configured to execute the instructions to:
- accept the selection of the first process, the second process, or the third process based on an input of the selection buttons by the store employee or the customer.

5. The settlement device according to claim 1, wherein the at least one processor is further configured to execute the instructions to:

accept authentication information of the store employee and accept the selection of the first process, the second process, or the third process based on an input of the store employee when authentication which is based on the authentication information is successful.

6. A settlement method comprising:

displaying, on a touch screen display, a settlement mode selection screen including selection buttons for a first process, a second process, and a third process;

accepting a selection of one of the first process of acquiring settlement information of a commodity registered using a terminal device used by a customer, the second process of acquiring settlement information of a commodity registered by a settlement device having a registration function of registering the commodity through an operation of the customer, or the third process of acquiring settlement information of a commodity registered using a registration device that registers the commodity through an operation of a store employee;

in a case where the first process is selected:

displaying, on the touch screen display, a settlement reading screen requesting at least one of: reading of a settlement code displayed on the terminal device using a code scanner, or reading of identification information of the settlement device using the terminal device;

in a case where the second process is selected:

displaying, on the touch screen display, a commodity reading screen requesting reading of a commodity code using the code scanner, and in a case where the commodity code is read, switching the commodity reading screen to a commodity registration screen;

in a case of the settlement code being read, the reading of the commodity code being completed, or the settlement information being acquired from the registration device, displaying a payment method selection screen on the touch screen display;

accepting a selection of a payment method from the payment method selection screen; and performing the selected one of the first process, the second process, or the third process and performing settlement for a price at the settlement device using the acquired settlement information and the selected payment method.

7. A non-transitory computer-readable recording medium that records a program causing a settlement device to execute the processing of:

displaying, on a touch screen display, a settlement mode selection screen including selection buttons for a first process, a second process, and a third process;

accepting a selection of one of the first process of acquiring settlement information of a commodity registered using a terminal device used by a customer, the second process of acquiring settlement information of a commodity registered by the settlement device having a registration function of registering the commodity through an operation of the customer, or the third process of acquiring settlement information of a commodity registered using a registration device that registers the commodity through an operation of a store employee;

in a case where the first process is selected:

displaying, on the touch screen display, a settlement reading screen requesting at least one of: reading of a settlement code displayed on the terminal device using a code scanner, or reading of identification information of the settlement device using the terminal device;

in a case where the second process is selected:

displaying, on the touch screen display, a commodity reading screen requesting reading of a commodity code using the code scanner, and in a case where the commodity code is read, switching the commodity reading screen to a commodity registration screen;

in a case of one of the settlement code being read, the reading of the commodity code being completed, or the settlement information being acquired from the registration device, displaying a payment method selection screen on the touch screen display;

accepting a selection of a payment method from the payment method selection screen; and performing the selected one of the first process, the second process, or the third process and performing settlement for a price at the settlement device using the acquired settlement information and the selected payment method.

* * * * *